(12) United States Patent
Livingston et al.

(10) Patent No.: US 10,357,746 B2
(45) Date of Patent: Jul. 23, 2019

(54) SOLVENT RESISTANT POLYAMIDE NANOFILTRATION MEMBRANES

(71) Applicant: IMPERIAL INNOVATIONS LIMITED, London (GB)

(72) Inventors: Andrew Guy Livingston, London (GB); Yogesh Suresh Bhole, London (GB); Maria Fernanda Jimenez Solomon, London (GB)

(73) Assignee: IP2IPO INNOVATIONS LIMITED, London (GB)

( * ) Notice: Subject to any disclaimer, the term of this patent is extended or adjusted under 35 U.S.C. 154(b) by 0 days.

(21) Appl. No.: 15/355,276

(22) Filed: Nov. 18, 2016

(65) Prior Publication Data

US 2017/0157567 A1 Jun. 8, 2017

Related U.S. Application Data

(63) Continuation of application No. 13/810,935, filed as application No. PCT/GB2011/051364 on Jul. 19, 2011, now abandoned.

(30) Foreign Application Priority Data

Jul. 19, 2010 (GB) .................................. 1012083.0

(51) Int. Cl.
*B01D 71/56* (2006.01)
*B01D 67/00* (2006.01)
(Continued)

(52) U.S. Cl.
CPC ....... *B01D 67/0088* (2013.01); *B01D 61/027* (2013.01); *B01D 69/105* (2013.01);
(Continued)

(58) Field of Classification Search
None
See application file for complete search history.

(56) References Cited

U.S. PATENT DOCUMENTS

| 517,391 A | 3/1894 | Noble et al. |
| 3,708,458 A | 1/1973 | Alberino et al. |
| (Continued) |

FOREIGN PATENT DOCUMENTS

| EP | 0532198 | 3/1993 |
| EP | 0718029 | 6/1996 |
| (Continued) |

OTHER PUBLICATIONS

Kosaraju et al., "Interfacially polymerized thin film composite membranes on microporous polypropylene supports for solvent-resistant nanofiltration", Journal of Membrane Science 321 (20008) 155-161.

(Continued)

*Primary Examiner* — Patrick J Orme
(74) *Attorney, Agent, or Firm* — Barnes & Thornburg LLP

(57) ABSTRACT

The present invention relates to a composite membrane for nanofiltration of a feed stream solution comprising a solvent and dissolved solutes and showing preferential rejection of the solutes. The composite membrane comprises a thin polymeric film formed by interfacial polymerization on a support membrane. The support membrane is further impregnated with a conditioning agent and is stable in polar aprotic solvents. The composite membrane is optionally treated in a quenching medium, where the interfacial polymerization reaction can be quenched and, in certain embodiments, membrane chemistry can be modified. Finally the composite membrane is treated with an activating solvent prior to nanofiltration.

16 Claims, 15 Drawing Sheets

(51) Int. Cl.
B01D 69/10 (2006.01)
B01D 69/12 (2006.01)
B01D 61/02 (2006.01)
B01D 71/64 (2006.01)

(52) U.S. Cl.
CPC .......... B01D 69/12 (2013.01); B01D 69/125 (2013.01); B01D 71/56 (2013.01); B01D 61/022 (2013.01); B01D 71/64 (2013.01); B01D 2325/022 (2013.01)

(56) References Cited

U.S. PATENT DOCUMENTS

| | | |
|---|---|---|
| 4,039,440 A | 8/1977 | Cadotte |
| 4,259,183 A | 3/1981 | Cadotte |
| 4,277,344 A | 7/1981 | Cadotte |
| 4,529,646 A | 7/1985 | Sundet |
| 4,765,879 A | 8/1988 | Matsumoto et al. |
| 4,765,897 A | 8/1988 | Cadotte et al. |
| 4,769,148 A | 9/1988 | Fibiger et al. |
| 4,812,270 A | 3/1989 | Cadotte et al. |
| 4,824,574 A | 4/1989 | Cadotte et al. |
| 4,830,885 A | 5/1989 | Tran et al. |
| 4,853,122 A | 8/1989 | McCray |
| 4,859,384 A | 8/1989 | Fibiger et al. |
| 4,876,009 A | 10/1989 | McCray |
| 4,950,404 A | 8/1990 | Chau |
| 5,173,191 A | 12/1992 | Black |
| 5,174,899 A | 12/1992 | Bahrmann et al. |
| 5,215,667 A | 6/1993 | Livingston, Jr. et al. |
| 5,234,598 A | 8/1993 | Tran et al. |
| 5,246,587 A | 9/1993 | Tomaschke |
| 5,274,047 A | 12/1993 | Koenhen et al. |
| 5,288,818 A | 2/1994 | Livingston, Jr. et al. |
| 5,290,452 A | 3/1994 | Schucker |
| 5,298,669 A | 3/1994 | Healy et al. |
| 5,358,745 A | 10/1994 | Tran et al. |
| 5,395,979 A | 3/1995 | Deckman et al. |
| 5,576,057 A | 11/1996 | Hirose et al. |
| 5,582,725 A | 12/1996 | McCray et al. |
| 5,614,099 A | 3/1997 | Hirose et al. |
| 5,733,602 A | 3/1998 | Hirose et al. |
| 5,755,965 A | 5/1998 | Reiber |
| 5,843,351 A | 12/1998 | Hirose et al. |
| 5,876,602 A | 3/1999 | Jons et al. |
| 5,989,426 A | 11/1999 | Hirose et al. |
| 6,024,873 A | 2/2000 | Hirose et al. |
| 6,245,234 B1 | 6/2001 | Koo et al. |
| 6,837,381 B2 | 1/2005 | Hirose |
| 6,887,380 B2 | 5/2005 | Lee et al. |
| 6,986,844 B2 | 1/2006 | Barss et al. |
| 2003/0098274 A1 | 5/2003 | Lee et al. |
| 2005/0000899 A1 | 1/2005 | Koros et al. |
| 2006/0219628 A1 | 10/2006 | Koo et al. |
| 2008/0149561 A1 | 6/2008 | Chu et al. |
| 2008/0197070 A1 | 8/2008 | Sirkar et al. |
| 2008/0207822 A1 | 8/2008 | Yeager et al. |
| 2008/0257818 A1* | 10/2008 | Konishi ............ B01D 69/02 210/490 |
| 2008/0312349 A1 | 12/2008 | Yeager et al. |
| 2010/0038306 A1* | 2/2010 | Livingston ........ B01D 61/027 210/496 |
| 2010/0181253 A1* | 7/2010 | Vandezande ...... B01D 53/228 210/650 |
| 2013/0112619 A1 | 5/2013 | Livingston et al. |

FOREIGN PATENT DOCUMENTS

| | | |
|---|---|---|
| EP | 0695213 | 8/1998 |
| EP | 1233036 | 8/2002 |
| EP | 1707255 | 10/2006 |
| EP | 1707255 A2 * | 10/2006 ......... B01D 67/0006 |
| EP | 1590361 | 3/2015 |
| GB | 2369311 | 5/2002 |
| GB | 2373743 | 10/2002 |
| GB | 2437519 | 10/2007 |
| JP | 58049412 | 3/1983 |
| JP | 60099309 | 6/1985 |
| JP | 05192551 | 8/1993 |
| JP | 11028466 | 2/1999 |
| JP | 2002-204912 | 7/2002 |
| JP | 2006122886 | 5/2006 |
| JP | 2007144414 | 6/2007 |
| WO | 2008/138078 | 11/2008 |
| WO | WO2010/035041 | 4/2010 |

OTHER PUBLICATIONS

Vandezande et al., "Solvent resistant nanofiltration: separating on a molecular level", Chemical Society Reviews 2008, 37, 365-405.
International Search Report and Written Opinion for PCT/GB2011/051364, completed Oct. 2011. 11.
Chen et al., "Preparation and Separation Properties of Polyamide Nanofiltration Membrane," Journal of Applied Polymer Science, vol. 83, (2002) 1112-1118.
Mukherjee et al., "Chemical treatment for improved performance of reverse osmosis membranes," Desalination 104 (1996) 239-249.
Kwak et al., "Structure-Motion-Performance Relationship of Flux-Enhanced Reverse Osmosis (RO) Membranes Composed of Aromatic Polyamide Thin Films," Environ. Sci. Technol. 35 (2001) 4334-4340.
Kim et al., "Positron Annihilation Spectroscopic Evidence to Demonstrate the Flux-Enhancement Mechanism in Morphology-Controlled Thin-Film-Composite (TFC) Membrane," Environ. Sci. Technol. 39 (2005) 1764-1770.
Kim et al., "Preparation of Interfacially Synthesized and Silicone-Coated Composite Polyamide Nanofiltration Membranes with High Performance," Ind. Eng. Chem. Res. 41 (2002) 5523-5528.
Petersen, R.J., "Composite reverse osmosis and nanofiltration membranes," Journal of Membrane Science, 83 (1993) 81-150.
Mukherjee et al., "Flux enhancement of reverse osmosis membranes by chemical surface modification," Journal of Membrane Science 97 (1994) 231-249.
Kulkarni et al., "Flux enhancement by hydrophilization of thin film composite reverse osmosis membranes," Journal of Membrane Science 114 (1996) 39-50.
Sforca et al., "Composite nanofiltration membranes prepared by in situ polycondensation of amines in a poly(ethylene oxide-b-amide) layer," Journal of Membrane Science 135 (1997) 179-186.
Belfer et al., "Surface modification of commercial composite polyamide reverse osmosis membranes," Journal of Membrane Science 129 (1998) 175-181.
Lu et al., "Preparation and characterization of NF composite membrane," Journal of Membrane Science 210 (2002) 3-11.
Liu et al., "Characterization of morphology controlled polyethersulfone hollow fiber membranes by the addition of polyethylene glycol to the dope and bore liquid solution," Journal of Membrane Science 223 (2003) 187-199.
Tarboush et al., "Preparation of thin-film-composite polyamide membranes for desalination using novel hydrophilic surface modifying macromolecules," Journal of Membrane Science 325 (2008) 166-175.
Kim et al., "Effect of Aqueous and Organic Solutions on the Performance of Polyamide Thin-Film-Composite Nanofiltration Membranes," Journal of Polymer Science: Part B: Polymer Physics, vol. 40 (2002) 2151-2163.
Wavhal et al., "Membrane Surface Modification by Plasma-Induced Polymerization of Acrylamide for Improved Surface Properties and Reduced Protein Fouling," Langmuir 19 (2003) 79-85.
Solomon et al., "High flux membranes for organic solvent nanofiltration (OSN)—Interfacial polymerization with solvent activation," Journal of Membrane Science 423-424 (2012) 371-382.

* cited by examiner

SOLVENT RESISTANT POLYAMIDE NANOFILTRATION MEMBRANES

CROSS-REFERENCE TO RELATED APPLICATIONS

This application is a continuation application of U.S. application Ser. No. 13/810,935, filed on Jan. 18, 2013, which is a national stage entry under 35 U.S.C. § 371(b) of International Application No. PCT/GB2011/051364, filed Jul. 19, 2011, which claims the benefit of United Kingdom Patent Application Serial No. 1012083.0, filed Jul. 19, 2010, the entire disclosures of all of which are incorporated herein by reference.

The work leading to this invention has received funding from the European Union Seventh Framework Programme (FP7/2007-2013) under grant agreement number 214226.

FIELD OF INVENTION

The present invention relates to thin film composite membranes formed by interfacial polymerisation. Membranes and membrane systems described herein may be used in a variety of applications, including, but not limited to, nanofiltration, desalination and water treatment, and particularly the nanofiltration of solutes dissolved in organic solvents.

BACKGROUND TO THE INVENTION

Membrane processes have been widely applied in separation science, and can be applied to a range of separations of species of varying molecular weights in liquid and gas phases (see for example "Membrane Technology and Applications" $2^{nd}$ Edition, R. W. Baker, John Wiley and Sons Ltd, ISBN 0-470-85445-6).

With particular reference to nanofiltration, such applications have gained attention based on the relatively low operating pressures, high fluxes and low operation and maintenance costs associated therewith. Nanofiltration is a membrane process utilising membranes of molecular weight cut-off in the range of 200-2,000 Daltons. Molecular weight cut-off of a membrane is generally defined as the molecular weight of a molecule that would exhibit a rejection of 90% when subjected to nanofiltration by the membrane. Nanofiltration has been widely applied to filtration of aqueous fluids, but due to a lack of suitable solvent stable membranes, it has not been widely applied to the separation of solutes in organic solvents. This is despite the fact that organic solvent nanofiltration (OSN) has many potential applications in manufacturing industry including solvent exchange, catalyst recovery and recycling, purifications, and concentrations. U.S. Pat. Nos. 5,174,899 5,215,667; 5,288, 818; 5,298,669 and 5,395,979 disclose the separation of organometallic compounds and/or metal carbonyls from their solutions in organic media. UK Patent No. GB 2,373, 743 describes the application of OSN to solvent exchange; UK Patent No. GB 2,369,311 describes the application of OSN to recycle of phase transfer agents, and; European Patent Application EP1590361 describes the application of OSN to the separation of synthons during oligonucleotide synthesis.

Nanofiltration membranes for aqueous applications are generally fabricated by making composite membranes. Thin film composite membranes may be fabricated via interfacial polymerization (herein also referred to as TP) or by dip-coating [Lu, X.; Bian, X.; Shi, L., "Preparation and characterization of NF composite membrane." J. Membr. Sci., 210, 3-11, 2002].

In the IP technique, an aqueous solution of a reactive monomer (often a polyamine) is first deposited in the pores of a microporous support membrane, often a polysulfone ultrafiltration membrane. Then, the polysulfone support membrane loaded with the monomer is immersed in a water-immiscible solvent solution containing a reactive monomer, such as diacid chloride in hexane. The two monomers react at the interface of the two immiscible solutions, until a thin film presents a diffusion barrier and the reaction is completed to form a highly cross-linked thin film layer that remains attached to the support membrane. The thin film layer can be from several tens of nanometers to several micrometers thick. The IP technique is well known to those skilled in the art [Petersen, R. J. "Composite reverse osmosis and nanofiltration membranes". J. Membr. Sci, 83, 81-150, 1993]. The thin film is selective between molecules, and this selective layer can be optimized for solute rejection and solvent flux by controlling the coating conditions and characteristics of the reactive monomers. The microporous support membrane can be selectively chosen for porosity, strength and solvent resistance. A particularly preferred class of thin film materials for nanofiltration are polyamides formed by interfacial polymerization. Examples of such polyamide thin films are found in U.S. Pat. Nos. 5,582,725, 4,876,009, 4,853,122, 4,259,183, 4,529,646, 4,277,344 and 4,039,440, the pertinent disclosures of which are incorporated herein by reference.

U.S. Pat. No. 4,277,344 describes an aromatic polyamide membrane produced by the interfacial polymerization of an aromatic polyamine with at least two primary amine substituents and an acyl halide having at least three acyl halide substituents. Wherein, the aqueous solution contains a monomeric aromatic polyamine reactant and the organic solution contains an amine-reactive polyfunctional acyl halide. The polyamide layer of TFC membranes is typically obtained via an interfacial polymerization between a piperazine or an amine substituted piperidine or cyclohexane, and a polyfunctional acyl halide as described in U.S. Pat. Nos. 4,769,148 and 4,859,384. A way of modifying reverse osmosis (herein also referred to as RO) TFC membranes for nanofiltration is described in U.S. Pat. Nos. 4,765,897; 4,812,270; and 4,824,574. Post-interfacial polymerization treatments have also been used to increase the pore size of TFC RO membranes.

U.S. Pat. No. 5,246,587 describes an aromatic polyamide RO membrane that is made by first coating a porous support material with an aqueous solution containing a polyamine reactant and an amine salt. Examples of suitable polyamine reactants provided include aromatic primary diamines (such as, m-phenylenediamine or p-phenylenediamine or substituted derivatives thereof, wherein the substituent is an alkyl group, an alkoxy group, a hydroxy alkyl group, a hydroxy group or a halogen atom; aromatic secondary diamines (such as, N,N-diphenylethylene diamine), cycloaliphatic primary diamines (such as cyclohexane diamine), cycloaliphatic secondary diamines (such as, piperazine or trimethylene dipiperidine); and xylene diamines (such as m-xylene diamine).

In another method described in U.S. Pat. No. 6,245,234, a TFC polyamide membrane is made by first coating a porous polysulfone support with an aqueous solution containing: 1) a polyfunctional primary or secondary amine; 2) a polyfunctional tertiary amine; and; 3) a polar solvent. The excess aqueous solution is removed and the coated support is then dipped in an organic solvent solution of trimesoyl chloride (TMC) and a mixture of alkanes having from eight to twelve carbon atoms.

Many different types of polymers may be interfacially synthesized using interfacial polymerization. Polymers typically used in interfacial polymerization applications include, but are not limited to, polyamides, polyurea, polypyrrolidines, polyesters, polyurethanes, polysiloxanes, poly(amide imide), poly(ether amide), poly(urea amide) (PUA) [Petersen, R. J. "*Composite reverse osmosis and nanofiltration membranes*". *J. Membr. Sci*, 83, 81-150, 1993]. For example, U.S. Pat. No. 5,290,452 describes the formation of a crosslinked polyester amide TFC membrane produced via interfacial polymerization. The membrane is made by reacting a dianhydride (or its corresponding diacid-diester) with a polyester diol to produce an end-capped prepolymer. The resulting end-capped prepolymer is then reacted with excess thionyl chloride to convert all unreacted anhydride and all carboxylic-acid groups into acid chloride groups. The resulting acid-chloride derivative is dissolved in organic solvent and interfacially reacted with a diamine dissolved in an aqueous phase.

The support membranes generally used for commercial TFC membranes are often polysulfone or polyethersulfone ultrafiltration membranes. These supports have limited stability for organic solvents and, therefore, thin film composites membranes of the prior art which are fabricated with such supports cannot be effectively utilized for all organic solvent nanofiltration applications.

Although interfacially polymerized TFC membranes of the prior art have been specifically designed to separate aqueous feed streams down to a molecular level, they can be applied in certain organic solvents as well [Koseoglu, S. S., Lawhon, J. T. & Lusas, E. W. "*Membrane processing of crude vegetable oils pilot plant scale removal of solvent from oil miscellas*", *J. Am. Oil Chem. Soc.* 67, 315-322, 1990, U.S. Pat. No. 5,274,047]. Their effectiveness depends on the specific molecular structure of the thin film layer and the stability of the support membrane. U.S. Pat. No. 5,173,191, suggests nylon, cellulose, polyester, Teflon and polypropylene as organic solvent resistant supports. U.S. Pat. No. 6,986,844 proposes the use of crosslinked polybenzimidazole for making suitable support membranes for TFC. TFC membranes comprising a thin film synthesized from piperazine/m-phenylenediamine and trimesoyl chloride on a PAN support membrane performed well in methanol, ethanol and acetone, less well in i-propanol and MEK, and gave no flux in hexane [Kim, I.-C., Jegal, J. & Lee, K.-H. "*Effect of aqueous and organic solutions on the performance of polyamide thin-film-composite nanofiltration membranes.*" *Journal of Polymer Science Part B: Polymer Physics* 40, 2151-2163, 2002].

US 2008/0197070 describes the formation of thin film composite membranes on polyolefin (e.g. polypropylene) supports prepared by interfacial polymerization. These membranes performed well in water, ethanol and methanol.

Non-reactive polydimethylsiloxane (PDMS) has been added during the interfacial polymerization reaction using polyacrylonitrile (PAN) as the support membrane [Kim, I. C. & Lee, K. H. "*Preparation of interfacially synthesized and silicone-coated composite polyamide nanofiltration membranes with high performance.*" *Ind. Eng. Chem. Res.* 41, 5523-5528, 2002, U.S. Pat. No. 6,887,380, U.S. Pat. Applic No. 0098274 2003]. The resulting silicone-blended PA membrane showed high hexane permeabilities.

TFC membranes have also been applied for filtration in apolar solvents. A method for the separation of lube oil from organic solvents (e.g. furfural, MEK/toluene, etc.) with a TFC membrane using poly(ethylene imine) and a diisocyanate on a solvent resistant nylon 6,6 support has been described in U.S. Pat. No. 517,391.

In interfacially polymerized composite membranes, both the surface chemistry and the morphology of the support membrane play a crucial role in determining the overall composite membrane performance. Membrane performance can be enhanced through modification of the membrane surface [D. S. Wavhal, E. R. Fisher, "*Membrane surface modification by plasma-induced polymerization of acrylamide for improved surface properties and reduced protein fouling*", *Langmuir* 19, 79, 2003]. Thus, different procedures have been carried out to chemically modify the membrane surface and modify its properties. These procedures may increase the hydrophilicity, improve selectivity and flux, adjust transport properties, and enhance resistance to fouling and chlorine. Many methods have been reported for membrane surface modification such as grafting, coating [U.S. Pat. Nos. 5,234,598, 5,358,745, 6,837,381] and blending of hydrophilic/-phobic surface modifying macromolecules (SMMs) [B. J. Abu Tarboush, D. Rana, T. Matsuura, H. A. Arafat, R. M. Narbaitz, "*Preparation of thin-film-composite polyamide membranes for desalination using novel hydrophilic surface modifying macromolecules*", *J. Membr. Sci.* 325, 166, 2008].

In order to improve the performance of TFC membranes, different constituents have been added to the amine and/or acyl halide solutions. For example, U.S. Pat. No. 4,950,404, describes a method for increasing flux of a TFC membrane by adding a polar aprotic solvent and an optional acid acceptor to the aqueous amine solution prior to the interfacial polymerization reaction. In a similar way, U.S. Pat. Nos. 5,989,426; 6,024,873; 5,843,351; 5,614,099; 5,733,602 and 5,576,057 describe the addition of selected alcohols, ketones, ethers, esters, halogenated hydrocarbons, nitrogen-containing compounds and sulfur-containing compounds to the aqueous amine solution and/or organic acid halide solution prior to the interfacial polymerization reaction.

It has been claimed that soaking freshly prepared TFC membranes in solutions containing various organic species, including glycerol, sodium lauryl sulfate, and the salt of triethylamine with camphorsulfonic acid can increase the water flux in RO applications by 30-70% [3]. As described in U.S. Pat. Nos. 5,234,598 and 5,358,745, TFC membrane physical properties (abrasion resistance), and flux stability can also be improved by applying an aqueous solution composed of poly(vinyl alcohol) (PVA) and a buffer solution as a post formation step during membrane preparation. Adding alcohols, ethers, sulfur-containing compounds, monohydric aromatic compounds and more specifically dimethyl sulfoxide (DMSO) in the aqueous phase can produce TFC membranes with an excellent performance [S.-Y. Kwak, S. G. Jung, S. H. Kim, "*Structure-motion-performance relationship of flux-enhanced reverse osmosis (RO) membranes composed of aromatic polyamide thin films*", *Environ. Sci. Technol.* 35, 4334, 2001; U.S. Pat. Nos. 5,576,057; 5,614,099]. After addition of DMSO to the interfacial polymerization system, TFC membranes with water flux five times greater than the normal TFC water flux with a small loss in rejection were obtained [S. H. Kim, S.-Y. Kwak, T. Suzuki, "*Positron annihilation spectroscopic evidence to demonstrate the flux-enhancement mechanism in morphology-controlled thin-film-composite (TFC) membrane*", *Environ. Sci. Technol.* 39, 1764, 2005].

However, in these prior art TFC membranes the use of a polysulfone support membrane limits the potential for additives to either aqueous amine solution or organic acid halide solution.

Several methods for improving the membrane performance post-formation are also known. For example, U.S. Pat. No. 5,876,602 describes treating the TFC membrane with an aqueous chlorinating agent to improve flux, lower salt passage, and/or increase membrane stability to bases. U.S. Pat. No. 5,755,965 discloses a process wherein the surface of the TFC membrane is treated with ammonia or selected amines, e.g., 1,6, hexane diamine, cyclohexylamine and butylamine. U.S. Pat. No. 4,765,879 describes the post treatment of a membrane with a strong mineral acid followed by treatment with a rejection enhancing agent.

A method of chemical treatment is claimed to be able to cause a simultaneous improvement of water flux and salt rejection of thin-film composite (TFC) membranes for reverse osmosis [Debabrata Mukherjee, Ashish Kulkarni, William N. Gill, "*Chemical treatment for improved performance of reverse osmosis membranes*", Desalination 104, 239-249, 1996]. Hydrophilization by treating the membrane surface with water soluble solvent (acids, alcohols, and mixtures of acids, alcohols and water) is a known surface modification technique. This method increases the flux without changing the chemical structure [Kulkarni, D. Mukherjee, W. N. Gill, "*Flux enhancement by hydrophilization of thin film composite reverse osmosis membranes*", J. Membr. Sci. 114, 39, 1996]. Using a mixture of acid and alcohol in water for the surface treatment can improve the surface properties, since acid and alcohol in water cause partial hydrolysis and skin modification, which produces a membrane with a higher flux and a higher rejection. It was suggested that the presence of hydrogen bonding on the membrane surface encourages the acid and water to react on these sites producing more charges [D. Mukherjee, A. Kulkarni, W. N. Gill, "*Flux enhancement of reverse osmosis membranes by chemical surface modification*", J. Membr. Sci. 97, 231, 1994]. Kulkarni et al. hydrophilized a TFC-RO membrane by using ethanol, 2-propanol, hydrofluoric acid and hydrochloric acid. They found that there was an increase in hydrophilicity, which led to a remarkable increase in water flux with no loss in rejection.

A hydrophilic, charged TFC can be achieved by using radical grafting of two monomers, methacrylic acid and poly(ethylene glycol) methacrylate onto a commercial PA-TFC-RO membrane [S. Belfer, Y. Purinson, R. Fainshtein, Y. Radchenko, O. Kedem, "*Surface modification of commercial composite polyamide reverse osmosis membranes*", J. Membr. Sci. 139, 175, 1998]. It was found that the use of amine containing ethylene glycol blocks enhanced the performance of the membrane, and highly improved membrane water permeability by increasing hydrophilicity [M. Sforca, S. P. Nunes, K.-V. Peinemann, "*Composite nanofiltration membranes prepared by in-situ polycondensation of amines in a poly(ethylene oxide-b-amide) layer*", J. Membr. Sci. 135, 179, 1997]. Poly(ethylene glycol) (PEG) and its derivatives have been used for surface modification. TFC membrane resistance to fouling could be improved by grafting PEG chains onto the TFC-RO membranes [1, 2].

PEG has also been used to improve the TFC membrane formation [Shih-Hsiung Chen, Dong-Jang Chang, Rey-May Liou, Ching-Shan Hsu, Shiow-Shyung Lin, "*Preparation and Separation Properties of Polyamide Nanofiltration Membrane*", J Appl Polym Sci, 83, 1112-1118, 2002]. Because of the poor hydrophilicity of the polysulfone support membrane, poly(ethylene glycol) (PEG) was added to the aqueous solution as a wetting agent. The effect of PEG concentration on the resulting membrane performance was also studied.

It has been reported that PEG is frequently used as an additive in the polymer solution to influence the membrane structure during phase inversion [Y. Liu, G. H. Koops, H. Strathmann, "*Characterization of morphology controlled polyethersulfone hollow fiber membranes by the addition of polyethylene glycol to the dope and bore liquid solution*", J. Membr. Sci. 223, 187, 2003]. The role of these additives is to create a spongy membrane structure by prevention of macrovoid formation and enhance pore formation during phase inversion. Other frequently used additives are: glycerol, alcohols, dialcohols, water, polyethylene oxide (PEO), LiCl and $ZnCl_2$. US patent Nos. 2008/0312349 A and 2008/207822 A also describe the use of PEG in the polymeric dope solution during preparation of microporous support membranes.

Prior art TFC membranes are not claimed to be suited for filtrations in harsh solvents (e.g. THF, DMF). Thus, current and emerging applications, using non-aqueous media in pressure-driven membrane processes, present a need for production of membranes that exhibit greater stability. The membrane products and membrane-related methods of the present invention advantageously address and/or overcome the obstacles, limitations and problems associated with current membrane technologies and effectively address membrane-related needs that are noted herein.

SUMMARY OF THE INVENTION

The present invention provides composite membranes formed by interfacial polymerisation which are particularly suitable for nanofiltration in organic solvents.

More particularly, the present invention relates to the production and utilization of membranes for nanofiltration operations in polar aprotic solvents.

In a first aspect, the invention provides a membrane for nanofiltration of a feed stream solution comprising a solvent and dissolved solutes and showing preferential rejection of the solutes, wherein the membrane is a composite membrane formed from interfacial polymerisation of a thin polymeric film on a support membrane, wherein the support membrane is impregnated with a conditioning agent and is stable in polar aprotic solvents; and wherein the composite membrane is treated with an activating solvent prior to use in nanofiltration.

Suitably, the composite membrane is treated with an activating solvent during or after interfacial polymerisation. Without wishing to be bound by any particular theory, the use of an activating solvent to treat the membrane is believed to flush out any debris and unreacted material from the pores of the membrane following the interfacial polymerisation reaction. The treatment of the composite membrane with an activating solvent provides a membrane with improved properties, including, but not limited to, membrane flux.

In another aspect, the invention provides an interfacial polymerisation process for forming a composite membrane for solvent nanofiltration as defined herein, comprising the steps of:

(a) impregnating a porous support membrane comprising a first conditioning agent, with a first reactive monomer solution comprising:
  (i) a first solvent for the said first reactive monomer; (ii) a first reactive monomer and; (iii) optionally, an activating solvent, (iv) optionally, additives including alcohols, ketones, ethers, esters, halogenated hydrocarbons, nitrogen-containing compounds and sulphur-containing compounds, monohydric aromatic compounds;
wherein said support membrane is stable in polar aprotic solvents;
(b) contacting the impregnated support membrane with a second reactive monomer solution comprising:
   (i) a second solvent for the second reactive monomer; (ii) a second reactive monomer;
   (iii) optionally, additives including alcohols, ketones, ethers, esters, halogenated hydrocarbons, nitrogen-containing compounds and sulphur-containing compounds, monohydric aromatic compounds;
wherein the first solvent and the second solvent form a two phase system
(c) after a reaction period, immersing resulting composite membrane into a quench medium;
(d) treating the resulting asymmetric membrane with an activating solvent, and:
(e) optionally, impregnating the resulting composite membrane with a second conditioning agent.

In a further aspect the present invention provides a membrane obtainable by any one of the methods defined herein.

In a further aspect the present invention provides a membrane obtained by any one of the methods defined herein.

In a further aspect the present invention provides a membrane directly obtained by any one of the methods defined herein.

Membranes of the invention can be used for nanofiltration operations in organic solvents. In particular, they can be used for nanofiltration operations in polar aprotic solvents. This is advantageous with respect to many of the prior art thin film composite nanofiltration membranes, which lose structure and dissolve in polar aprotic solvents such as dimethylacetamide (DMAc), dimethylformamide (DMF), dimethyl sulfoxide (DMSO), tetrahydrofuran (THF), N-methyl-2-pyrrolidone (NMP) and dichloromethane (DCM). Yet a further advantage of the membranes of the present invention is activating solvents, which may include polar aprotic solvents, and additives may include a wide range of species in which the support membrane is stable. Yet a further advantage of the membranes of the present invention is that they may exhibit higher fluxes than known membranes when mixtures of water and organic solvent are being processed.

DESCRIPTION OF VARIOUS EMBODIMENTS

Figure 1:
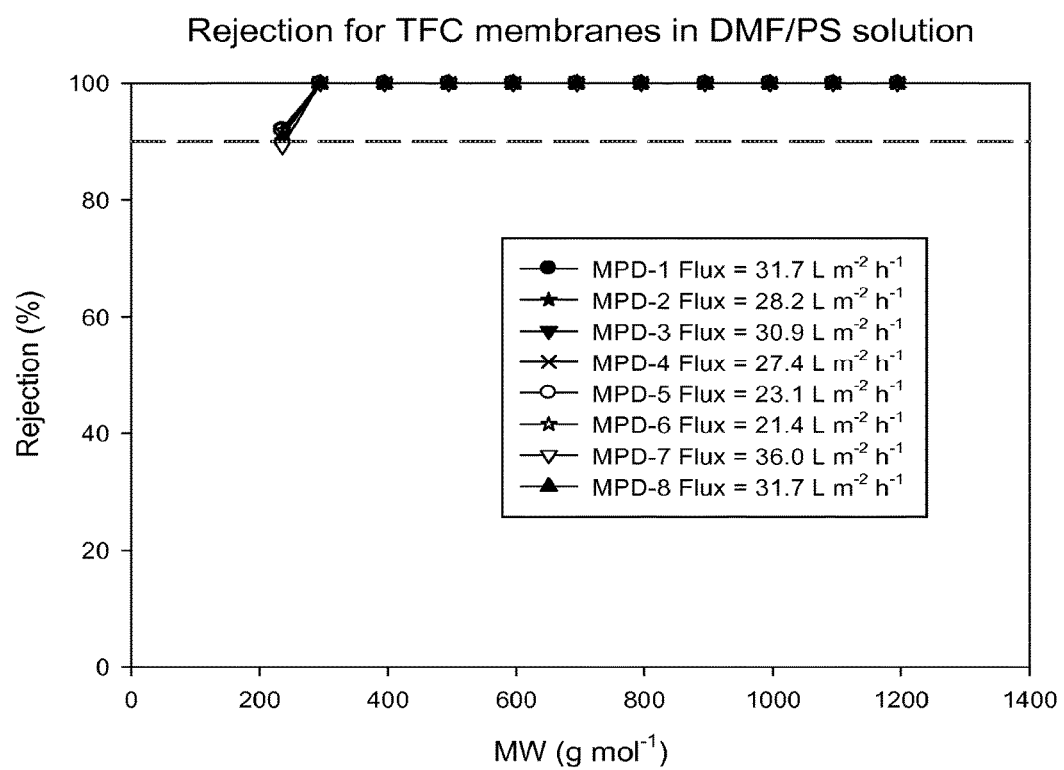
FIG. 1 shows molecular weight cut off (MWCO) curves and fluxes of TFC membranes after treatment with DMF as an activating solvent. Nanofiltration of a feed solution comprising polystyrene oligomers dissolved in DMF has been performed at 30 bar and 30° C.

Thin film composite (also referred to as TFC) membranes formed by interfacial polymerisation will be familiar to one of skill in this art and include an entity composed of a dense ultra-thin film layer over a support membrane, where the support membrane is previously formed from a different material.

Suitable support membranes can be produced from polymer materials including crosslinked polyimide, crosslinked polybenzimidazole, crosslinked polyacrylonitrile, Teflon, polypropylene, and polyether ether ketone (PEEK), or sulfonated polyether ether ketone (S-PEEK).

The polymer used to form the support membrane includes but is not limited to polyimide polymer sources. The identities of such polymers are presented in the prior art, U.S. Pat. No. 0,038,306, the entire contents of which are incorporated herein by reference. More preferably, the support membrane of the invention is prepared from a polyimide polymer described in U.S. Pat. No. 3,708,458, assigned to Upjohn, the entire contents of which are incorporated herein by reference. The polymer, available from HP polymers GmbH, Austria as P84, is a copolymer derived from the condensation of benzophenone 3,3',4-4'-tetracarboxylic acid dianhydride (BTDA) and a mixture of di(4-aminophenyl) methane and toluene diamine or the corresponding diisocyanates, 4,4'-methylenebis(phenyl isocyanate) and toluene diisocyanate. The obtained copolyimide has imide linkages which may be represented by the structural formulae:

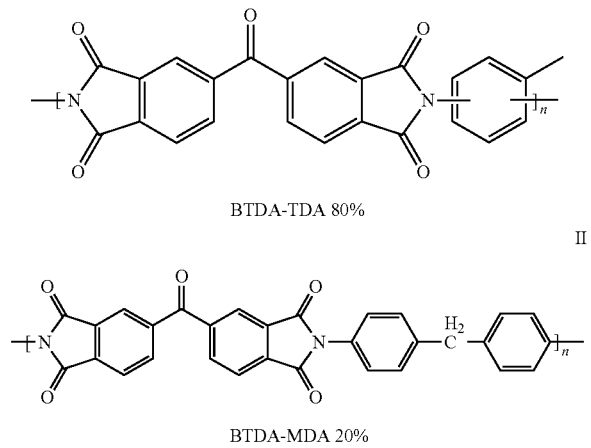

wherein the copolymer comprises from about 80% I and 20% II.

Support membranes can be prepared following the methods described in GB 2,437,519, the entire contents of which are incorporated herein by reference, and comprise both nanofiltration and ultrafiltration membranes. More preferably, the membranes of the invention used as supports are within the ultrafiltration range. The membrane supports of the invention may be crosslinked using suitable amine crosslinking agents and the crosslinking method and time may be that described in GB 2,437,519.

It is an important feature of the present invention that the support membrane is impregnated with a conditioning agent. The term "conditioning agent" is used herein to refer to any agent which, when impregnated into the support membrane prior to the interfacial polymerisation reaction, provides a resulting membrane with a higher rate of flux after drying. Any suitable conditioning agent may be used. Suitably, the conditioning agent is a low volatility organic liquid. The conditioning agent may be chosen from synthetic oils (e.g., polyolefinic oils, silicone oils, polyalphaolefinic oils, polyisobutylene oils, synthetic wax isomerate oils, ester oils and alkyl aromatic oils), mineral oils (including solvent refined oils and hydroprocessed mineral oils and petroleum wax isomerate oils), vegetable fats and oils, higher alcohols (such as decanol, dodecanol, heptadecanol), glycerols, and glycols (such as polypropylene glycols, polyethylene glycols, polyalkylene glycols). Suitable solvents for dissolving the conditioning agent include water, alcohols, ketones, aromatics, hydrocarbons, or mixtures thereof. The first and second conditioning agents referred to herein may be the same or different.

In this invention, prior to the interfacial polymerization reaction, the support membrane is treated with a first conditioning agent dissolved in a solvent to impregnate the support membrane. Suitably, the first conditioning agent is a low volatility organic liquid as defined above.

Following treatment with the conditioning agent, the support membrane is typically dried in air at ambient conditions to remove residual solvent.

The interfacial polymerization reaction is generally held to take place at the interface between the first reactive monomer solution, and the second reactive monomer solution, which form two phases. Each phase may include a solution of a dissolved monomer or a combination thereof. Concentrations of the dissolved monomers may vary. Variables in the system may include, but are not limited to, the nature of the solvents, the nature of the monomers, monomer concentrations, use of additives in any of the phases, reaction temperature and reaction time. Such variables may be controlled to define the properties of the membrane, e.g., membrane selectivity, flux, top layer thickness. Monomers used in the reactive monomer solutions may include, but are not limited to, diamines and diacyl halides. The resulting reaction may form a polyamide selective layer on top of the support membrane.

In this invention, the polymer matrix of the top layer can comprise any three-dimensional polymer network known to those of skill in the art. In one aspect, the thin film comprises at least one of an aliphatic or aromatic polyamide, aromatic polyhydrazide, poly-benzimidazolone, polyepiamine/amide, polyepiamine/urea, poly-ethyleneimine/urea, sulfonated polyfurane, polybenzimidazole, polypiperazine isophtalamide, a polyether, a polyether-urea, a polyester, or a polyimide or a copolymer thereof or a mixture thereof. Typically, the polymer selected to form the thin film can be formed by an interfacial polymerization reaction.

In a further embodiment of this invention, the film comprises a polyamide. The polyamide can be an aromatic polyamide or a non-aromatic polyamide. For example, the polyamide can comprise residues of a phthaloyl (e.g. terephthaloyl or isophthaloyl) halide, a trimesyl halide, or a mixture thereof. In another example, the polyamide can comprise residues of diaminobenzene, triaminobenzene, piperazine, poly-piperazine, polyetherimine or a mixture thereof. In a further embodiment, the film comprises residues of a trimesoyl halide and residues of a diaminobenzene. In a further embodiment, the film comprises residues of trimesoyl chloride and m-phenylenediamine. In a further aspect, the film comprises the reaction product of trimesoyl chloride and m-phenylenediamine.

The first reactive monomer solution may comprise an aqueous solution of a polyamine. This aqueous amine solution may also contain other components, such as polyhydric compounds as disclosed in U.S. Pat. No. 4,830,885. Examples of such compounds include ethylene glycol, propylene glycol, glycerine, polyethylene glycol, polypropylene glycol, and copolymers of ethylene glycol and propylene glycol. The aqueous amine solution may also contain polar aprotic solvents.

Aqueous monomer solutions may include, but are not limited to, an aqueous solution containing 1,6 hexenediamine, poly(ethyleneimine), an alternative aqueous monomer solution, and/or combinations thereof. Concentrations of solutions used in the interfacial polymerzation may be in a range from about 0.01 weight % to about 30 weight %. Preferably, concentrations of the interfacial polymerization solutions may be in a range from about 0.1% weight % to about 5 weight %.

The second reactive monomer solution may contain di- or triacyl chlorides such as trimesoyl chloride or other monomers, dissolved in a nonpolar solvent such as hexane, heptane, toluene or xylene. Further, the second reactive monomer solution may include, but is not limited to, a xylene solution of iso-phthaloyl dichloride, sebacoyl chloride, an alternative organic monomer solution, and/or combinations thereof.

The disclosed interfacial polymerization reaction time of step (b) may vary. For example, an interfacial polymerization reaction time may be in a range from about 5 seconds to about 2 hours.

The quenching step (c) includes contacting or treating the membrane after the interfacial polymerisation reaction with a quenching medium. The quenching medium quenches any un-reacted functional groups present following the interfacial polymerisation reaction.

In an embodiment, the quenching medium is water.

The quenching medium may also comprise an alcohol. The presence of an alcohol will cap any unreacted acyl chloride groups present following the interfacial polymerisation reaction. Suitable alcohols include, but are not limited to, R—OH, Ar—OH, alcohols optionally with one or more siloxane-substituents, alcohols with one or more halo-substituents (including fluorinated alcohols $R_F$OH, where $R_F$ is an alkyl group with one or more hydrogen atoms replaced by fluorine atoms), where R includes but is not limited to alkyl, alkene, haloalkyl (e.g. $R_F$), or Si—O—Si; and Ar is aryl (e.g. phenyl).

The quenching medium may also comprise one or more capping monomers as quenching agents. Such capping monomers may include amines. Suitable amines include but are not limited to R—$NH_2$, Ar—$NH_2$, amines with siloxane-substituents, alkylamines with halo-substituents including fluorine $R_F$$NH_2$ (where $R_F$ is an alkyl group in which one or more hydrogen atoms are replaced by fluorine atoms), where R includes but is not limited to alkyl, alkene, $R_F$, Si—O—Si.

The quenching medium may also comprise a solution containing R-acyl halides or Ar-acyl halides, where R includes but is not limited to alkyl, alkene, $R_F$, Si—O—Si.

In the above definitions, suitable alkyl groups or moieties comprise 1-20 carbon atoms and suitable alkene groups or moieties comprise 2-20 carbon atoms.

A post treatment step (d) includes contacting the composite membranes prior to use for nanofiltration with an activating solvent, including, but not limited to, polar aprotic solvents. In particular, activating solvents include DMAc, NMP, DMF and DMSO. The activating solvent in this art is defined as a liquid that enhances the composite membrane flux after treatment. The choice of activating solvent depends on the top layer and membrane support stability.

Contacting may be effected through any practical means, including passing the composite membrane through a bath of the activating solvent, or filtering the activating solvent through the composite membrane.

The second conditioning agent optionally applied in step (e) may be impregnated into the membrane by immersing the TFC membrane in a water or organic solvent bath or baths comprising the second conditioning agent.

The resultant high flux semipermeable TFC membranes of the invention can be used for nanofiltration operations, particularly in organic solvents, and more particularly nanofiltration operations in polar aprotic solvents.

By the term "nanofiltration" it is meant a membrane process which will allow the passage of solvents while retarding the passage of larger solute molecules, when a pressure gradient is applied across the membrane. This may be defined in terms of membrane rejection $R_i$, a common measure known by those skilled in the art and defined as:

$$R_i = \left(1 - \frac{C_{P_i}}{C_{R_i}}\right) \times 100\% \tag{1}$$

where $C_{P,i}$=concentration of species i in the permeate, permeate being the liquid which has passed through the membrane, and $C_{R,i}$=concentration of species i in the retentate, retentate being the liquid which has not passed through the membrane. It will be appreciated that a membrane is selectively permeable for a species i if $R_i$>0. It is well understood by those skilled in the art that nanofiltration is a process in which at least one solute molecule i with a molecular weight in the range 100-2,000 g $mol^{-1}$ is retained at the surface of the membrane over at least one solvent, so that $R_i$>0. Typical applied pressures in nanofiltration range from 5 bar to 50 bar.

The term "solvent" will be well understood by the average skilled reader and includes an organic or aqueous liquid with molecular weight less than 300 Daltons. It is understood that the term solvent also includes a mixture of solvents.

By way of non-limiting example, solvents include aromatics, alkanes, ketones, glycols, chlorinated solvents, esters, ethers, amines, nitriles, aldehydes, phenols, amides, carboxylic acids, alcohols, furans, and polar protic and polar aprotic solvents, water, and mixtures thereof.

By way of non-limiting example, specific examples of solvents include toluene, xylene, benzene, styrene, anisole, chlorobenzene, dichlorobenzene, chloroform, dichloromethane, dichloroethane, methyl acetate, ethyl acetate, butyl acetate, methyl ether ketone (MEK), methyl iso butyl ketone (MIBK), acetone, ethylene glycols, ethanol, methanol, propanol, butanol, hexane, cyclohexane, dimethoxyethane, methyl tert butyl ether (MTBE), diethyl ether, adiponitrile, N,N dimethylformamide, dimethylsulfoxide, N,N dimethylacetamide, dioxane, nitromethane, nitrobenzene, pyridine, carbon disulfide, tetrahydrofuran, methyltetrahydrofuran, N-methyl pyrrolidone, acetonitrile, water, and mixtures thereof.

The term "solute" will be well understood by the average skilled reader and includes an organic molecule present in a liquid solution comprising a solvent and at least one solute molecule such that the weight fraction of the solute in the liquid is less than the weight fraction of the solvent, and where the molecular weight of the solute is at least 20 g higher than that of the solvent.

The membrane of the present invention can be configured in accordance with any of the designs known to those skilled in the art, such as spiral wound, plate and frame, shell and tube, and derivative designs thereof.

The following examples illustrate the invention.

EXAMPLES

In the following examples, membrane performance was evaluated according to flux profiles and molecular weight cut off (MWCO) curves. All nanofiltration experiments were carried out at 30 bar using a cross-flow filtration system. Membrane discs, of active area 14 cm², were cut out from flat sheets and placed into 4 cross flow cells in series. Permeate samples for flux measurements were collected at intervals of 1 h, and samples for rejection evaluations were taken after steady permeate flux was achieved. The MWCO was determined by interpolating from the plot of rejection against molecular weight of marker compounds. The solute rejection test was carried out using two standard solutions. The first was a standard feed solution comprised of a homologous series of styrene oligomers (PS) dissolved in the selected solvent. The styrene oligomer mixture contained 1-2 g L$^{-1}$ each of PS 580 and PS 1090 (Polymer Labs, UK), and 0.01 g L of α-methylstyrene dimer (Sigma-Aldrich, UK). Analysis of the styrene oligomers was done using an Angilent HPLC system with UV/Vis detector set at a wavelength of 264 nm. Separation was achieved using a reverse phase column (C18-300, 250×4.6 mm). The mobile phase consisted of 35 vol % analytical grade water and 65 vol % tetrahydrofuran with 0.1 vol % trifluoroacetic acid. The second standard marker solution consisted of a solution of alkanes containing 0.1% (w/v) of each alkane. The alkanes used were: decane, n-hexadecane, n-tetradecane, eicosan, tetracosane, hexacosane. Their MWs are 142.3 Dalton, 198.4 Dalton, 226.4 Dalton, 280.5 Dalton, 338.7 Dalton, and 366.7 Dalton respectively. Analysis of the alkanes was via gas chromatography.

Solvent flux (J) was determined by measuring permeate volume (V) per unit area (A) per unit time (t) according to the following equation:

$$J = \frac{V}{A \cdot t} \quad (1)$$

The rejection ($R_i$) of markers was calculated from equation 2, where $C_{P,i}$ and $C_{F,i}$ correspond to styrene concentrations in the permeate and the feed respectively.

$$R_i = \left(1 - \frac{C_{P,i}}{C_{F,i}}\right) \cdot 100\% \quad (2)$$

Example 1

In the following example, membranes of the present invention are formed through interfacial polymerisation to form a polyamide on a crosslinked polyimide support membrane, as follows:

Formation of Crosslinked Polyimide Support Membrane

A polymer dope solution was prepared by dissolving 24% (w/w) polyimide (P84 from Evonik AG) in DMSO and stirring overnight until complete dissolution. A viscous solution was formed, and allowed to stand for 10 hours to remove air bubbles. The dope solution was then cast on a polyester or polypropylene (Viledon, Germany) non-woven backing material taped to a glass plate using a casting knife (Elcometer 3700) set at a thickness of 250 μm. Immediately after casting, the membrane was immersed in a water bath where phase inversion occurred. After 15 minutes, it was changed to a new water bath and left for an hour. The wet membrane was then immersed in a solvent exchange bath (isopropanol) to remove any residual water and preparation solvents.

The support membrane was then crosslinked using a solution of hexanediamine in isopropanol, by immersing the support membrane in the solution for 16 hours at room temperature. The support membrane was then removed from the crosslinking bath and washed with isopropanol for 1 h to remove any residual hexanediamine (HDA).

The final step for preparing the crosslinked polyimide support membrane involved immersing the membrane overnight into a conditioning agent bath consisting of a volume ratio of 3:2 polyethylene glycol 400/isopropanol. The membrane was then wiped with tissue paper and air dried.

Formation of Thin Film Composite Membranes by Interfacial Polymerisation:

TFC membranes were hand-cast on the crosslinked polyimide support membrane through interfacial polymerization. The support membrane was taped to a glass plate and placed in an aqueous solution of 2% (w/v) m-phenylenediamine (MPD, >99%, Sigma-Aldrich) for approximately 2 min. The MPD loaded support membrane was then rolled with a roller to remove excess solution. The MPD saturated membrane support was then immersed in a solution of 0.1% (w/v) trimesoyl chloride (TMC, 98%, Sigma-Aldrich) in hexane. After 1 min of reaction, the resulting membranes were withdrawn from the hexane solution and rinsed with water (which corresponds to step (c) of the process defined herein, i.e. immersing the membrane into a quenching medium).

The chemical structures of the monomers used for the interfacial polymerization reaction are shown in Scheme 1.

Scheme 1. Interfacial polymerization reaction

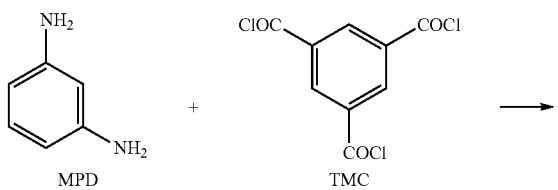

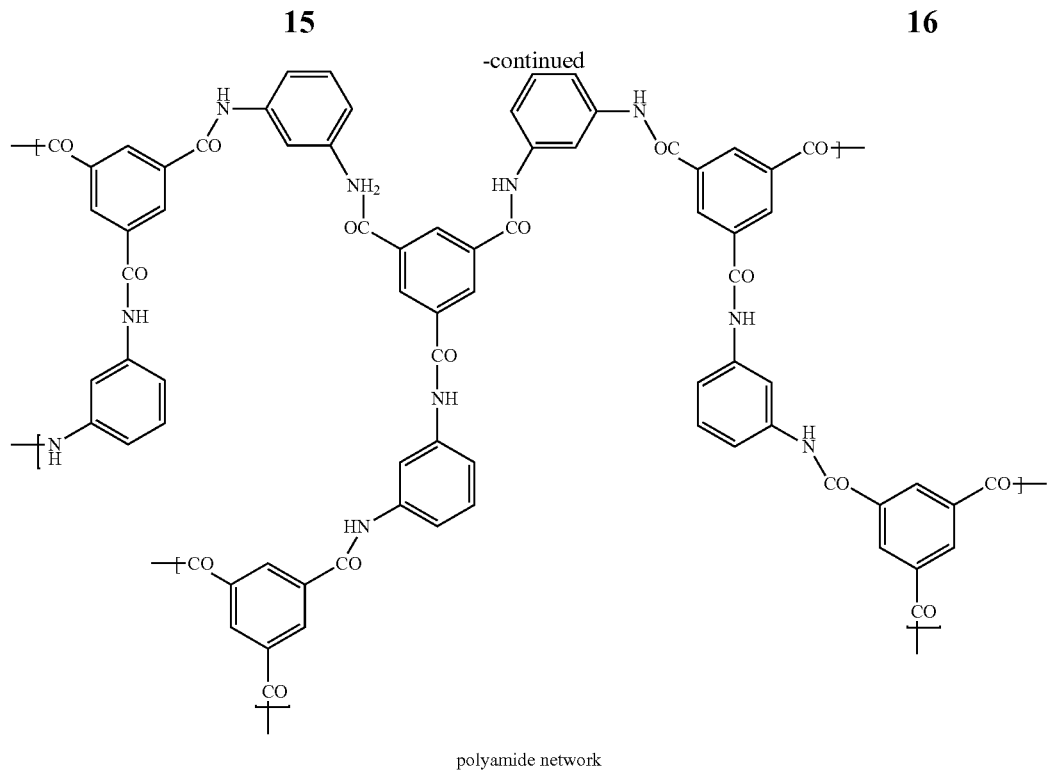

polyamide network

Membrane Identification Codes for the TFC Membranes Prepared in this Example are as Follows:

| Entry No. | Membrane | Membrane code |
|---|---|---|
| 1 | TFC membrane prepared on crosslinked PI as support impregnated with polyethylene glycol (PEG) | MPD-n |

Where n identifies membranes made in independent batch n.

Treatment of TFC Membranes with Activating Solvent (Step d).

A post-formation treatment step was carried out on the composite membranes in which the membranes were contacted with an activating solvent. In this example the activating solvent was DMF. The contact time was 10 minutes via either filtration or immersion.

Composite Membrane Performance.

Figure 2:
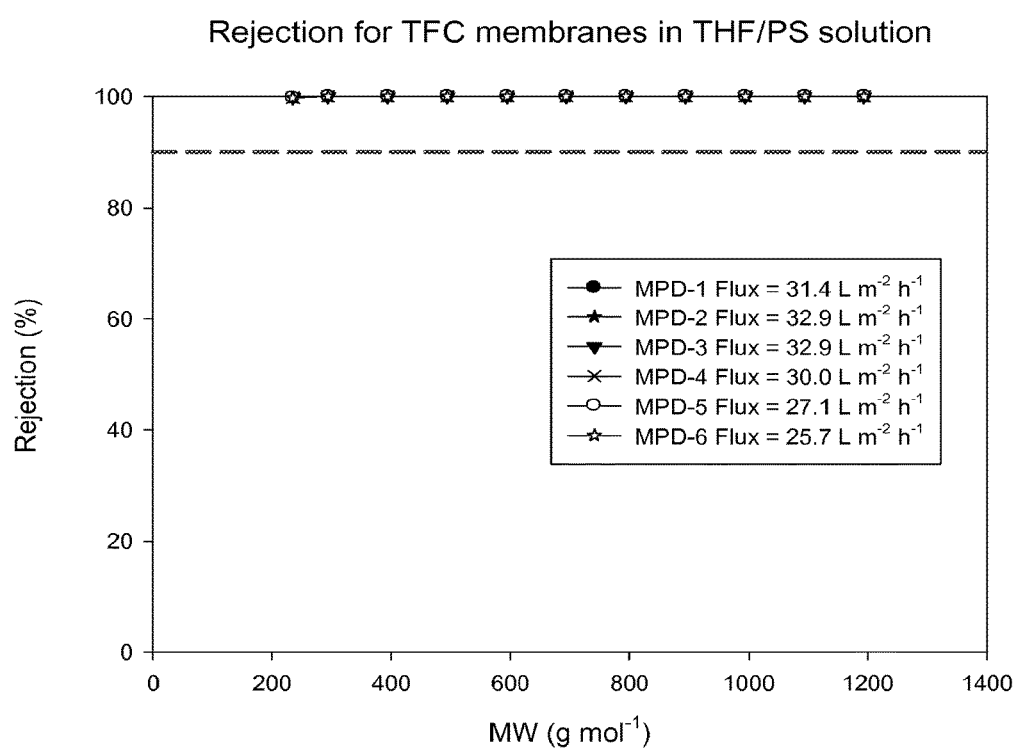
FIG. 2 shows MWCO curves and fluxes of TFC membranes after treatment with DMF as an activating solvent. Nanofiltration of a feed solution comprising polystyrene oligomers dissolved in THF has been performed at 30 bar and 30° C.
Figure 3:
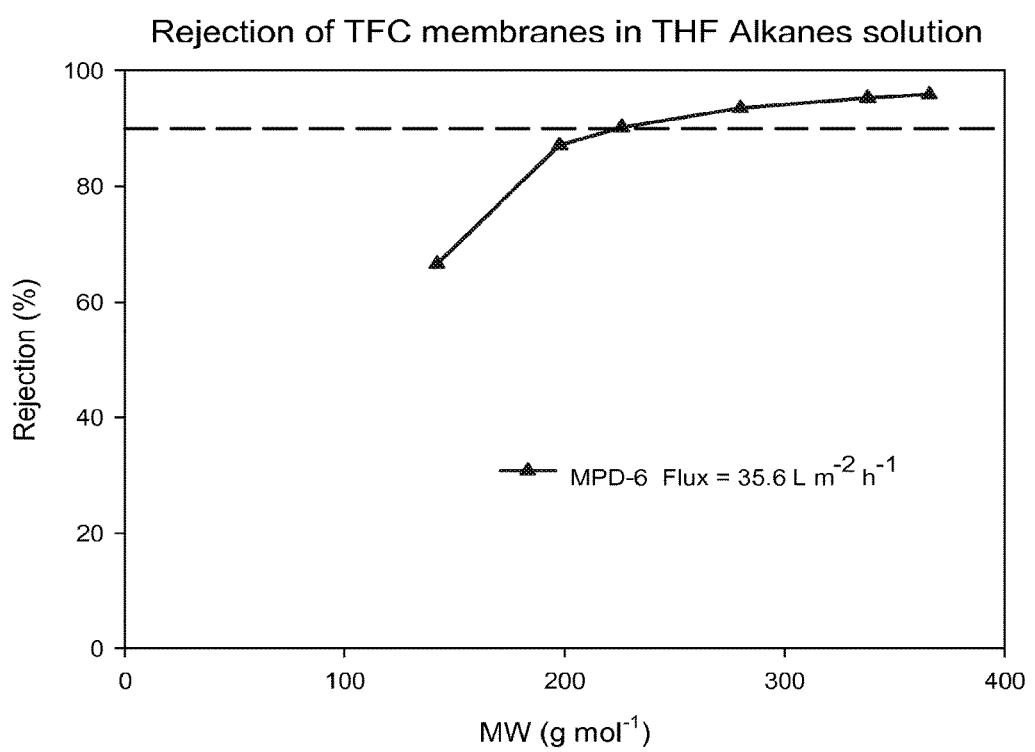
FIG. 3 shows MWCO curves and fluxes of TFC membranes after contacting with DMF as an activating solvent. Nanofiltration of a feed solution comprising alkanes dissolved in THF has been performed at 30 bar and 30° C.

The performance of TFC membranes in DMF and in THF were evaluated before and after treatment with DMF as an activating solvent. The rejection curves and fluxes for the TFC membranes in DMF/PS solution and in THF/PS solution after post-treatment with DMF are shown in FIGS. 1 and 2. FIG. 3 shows rejection curves and flux for the TFC membranes in THF/Alkanes solution. The TFC membranes showed no flux with THF before post-treatment with an activating solvent. It is clear that contacting the membrane with the activating solvent enhances flux.

Example 2

TFC membranes were fabricated as per EXAMPLE 1. Post-formation step (d) (contacting with DMF as an activating solvent) was only performed for some of the membranes. The performance of TFC membranes with and without the activation step (d) contacting with DMF was evaluated in different solvents, including acetone, methanol, ethyl acetate and toluene.

For the MWCO curves and flux test in MeOH, acetone, toluene and ethyl acetate with and without contacting with DMF, eight new MPD membranes were tested at each time and the results for both rejection and flux were reproducible.

Figure 4:
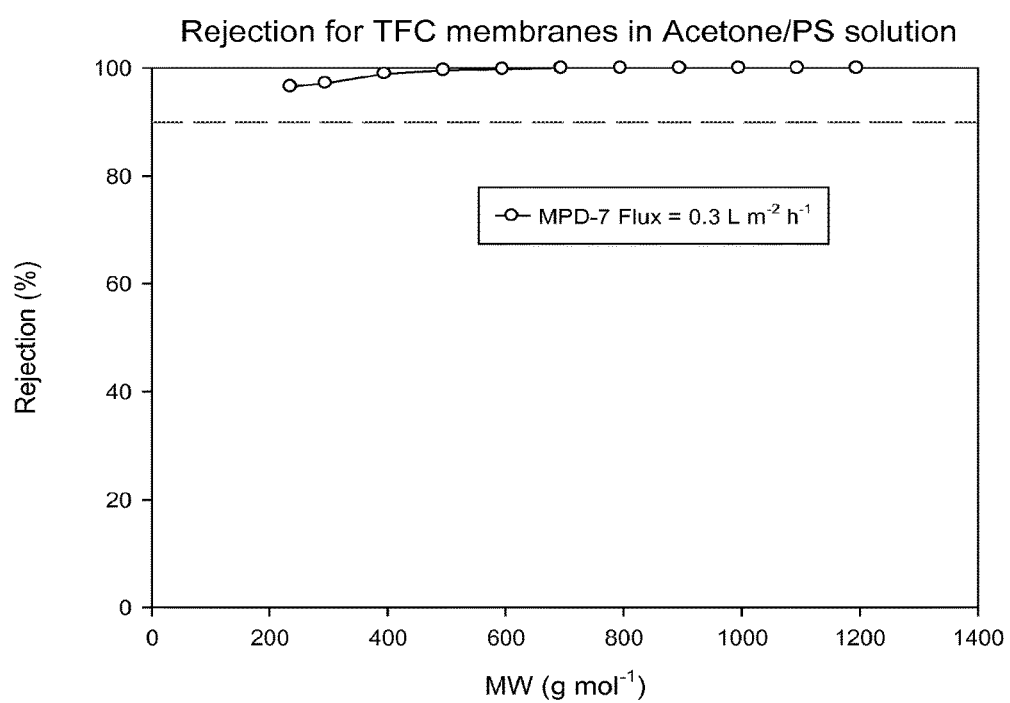
FIG. 4 shows the MWCO curve and flux of a TFC membrane which has not been treated with an activating solvent. Nanofiltration of a feed solution comprising polystyrene oligomers dissolved in acetone has been performed at 30 bar and 30° C.
Figure 5:
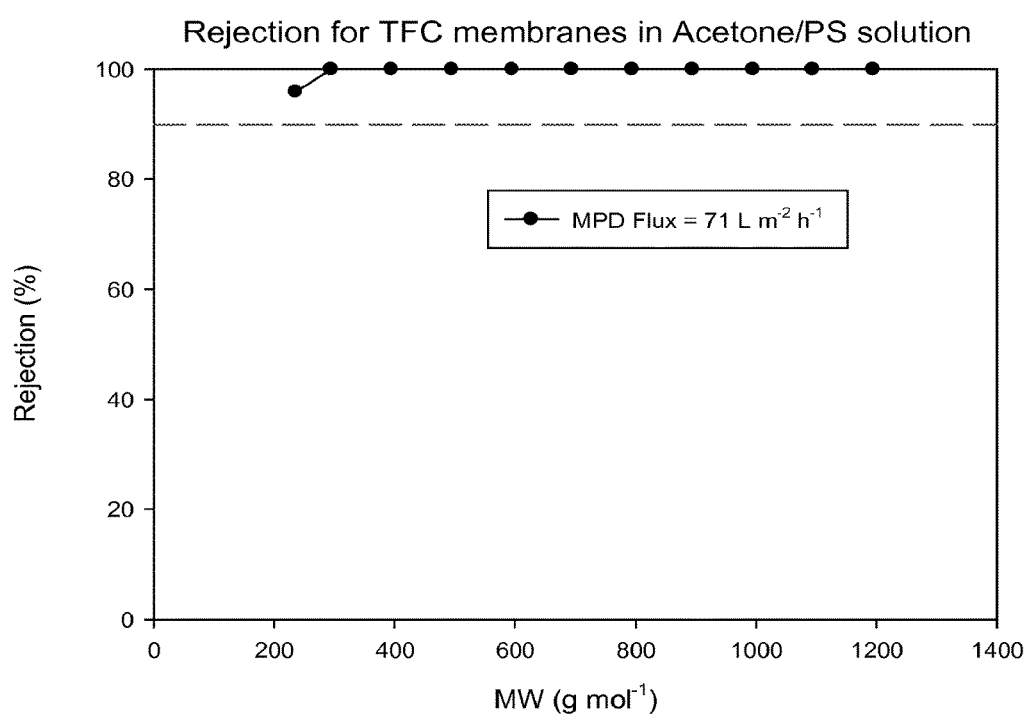
FIG. 5 shows the MWCO curve and flux of a TFC membrane which has been treated with DMF as an activating solvent. Nanofiltration of a feed solution comprising polystyrene oligomers dissolved in acetone has been performed at 30 bar and 30° C.

FIG. 4 shows rejection curves and flux for TFC membranes in acetone/PS without treating the membrane with an activating solvent. FIG. 5 shows rejection curves and flux for TFC membranes during nanofiltration of acetone/PS solution after treating the membranes with DMF.

Figure 6:
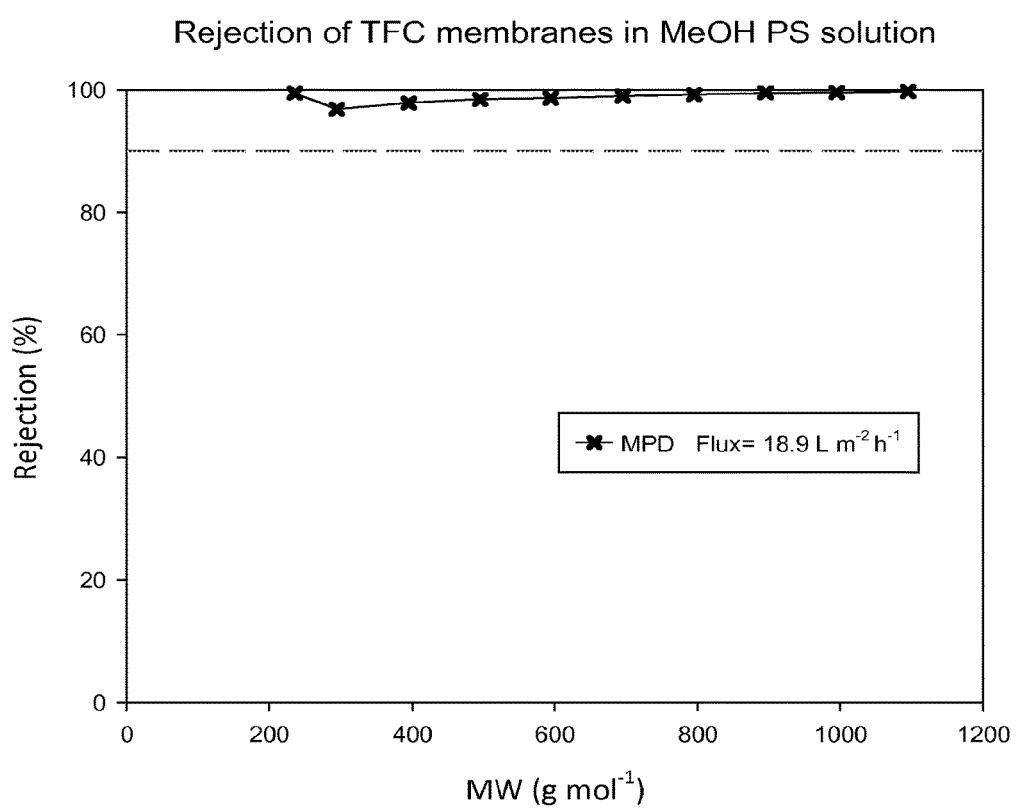
FIG. 6 shows MWCO curve and flux of a TFC membrane which has not been treated with an activating solvent. Nanofiltration of a feed solution comprising polystyrene oligomers dissolved in methanol has been performed at 30 bar and 30° C.
Figure 7:
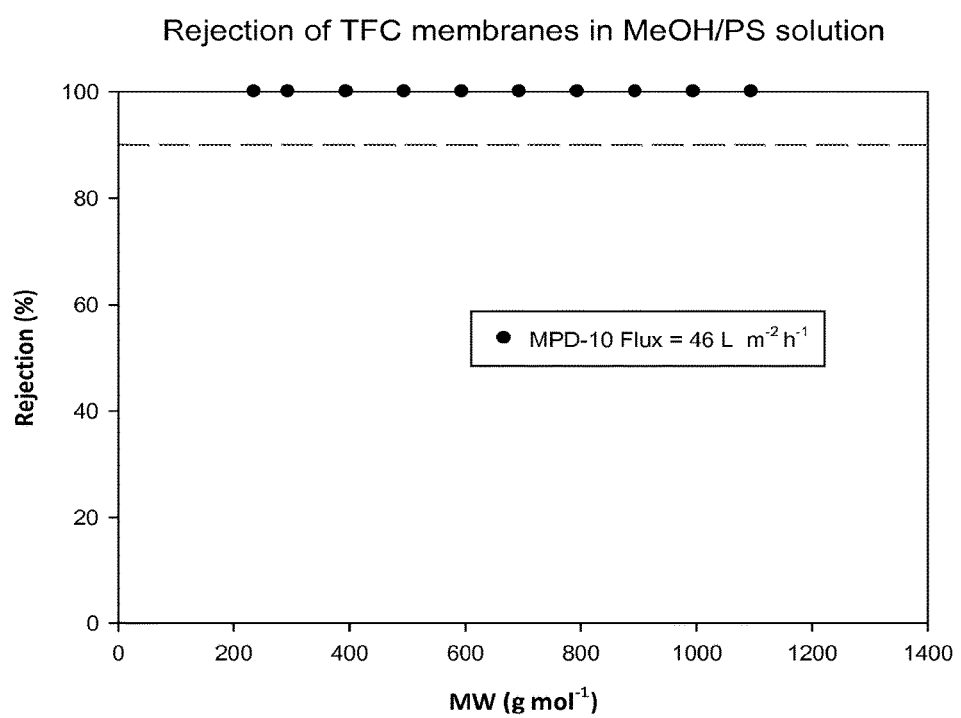
FIG. 7 shows MWCO curve and flux of a TFC membrane which has been treated with DMF as an activating solvent. Nanofiltration of a feed solution comprising polystyrene oligomers dissolved in methanol has been performed at 30 bar and 30° C.

FIG. 6 shows rejection curves and flux for TFC membranes during nanofiltration of MeOH/PS without treating the membrane with an activating solvent. FIG. 7 shows rejection curves and flux for TFC membranes during nanofiltration of MeOH/PS solution after treating the membranes with DMF.

Figure 8:
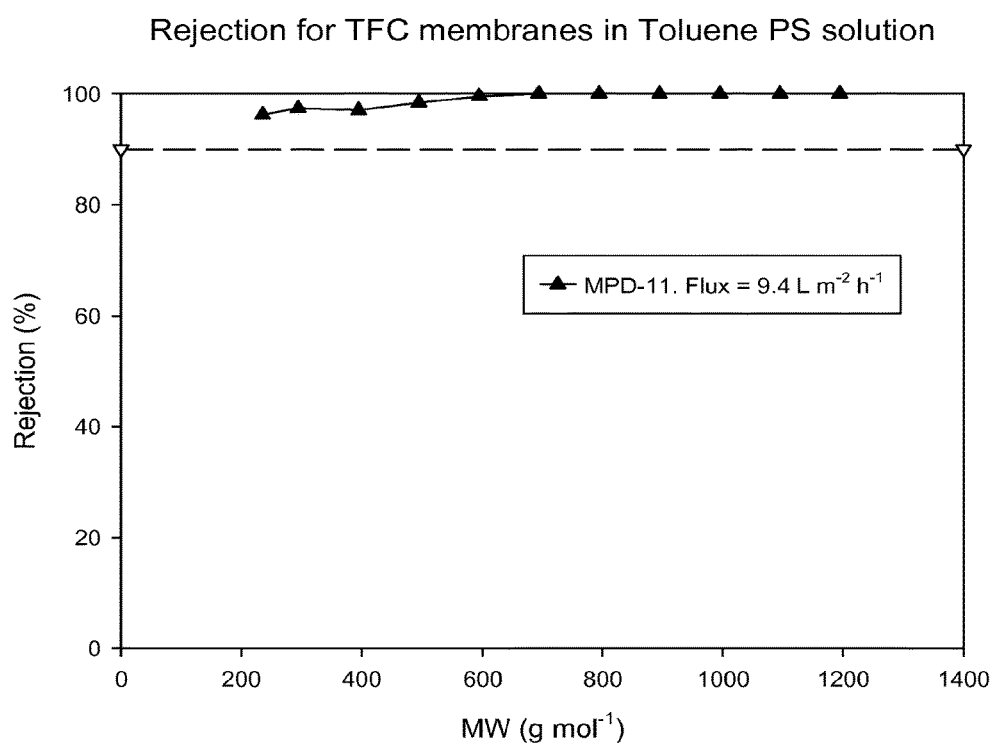
FIG. 8 shows MWCO curve and flux of a TFC membrane which has been treated with DMF as an activating solvent. Nanofiltration of a feed solution comprising polystyrene oligomers dissolved in toluene has been performed at 30 bar and 30° C.

The TFC membranes that were not treated with DMF showed no flux in toluene and ethyl acetate. FIG. 8 shows rejection curves and flux for TFC membranes in Toluene/PS solution after treating the membranes with DMF.

Figure 9:
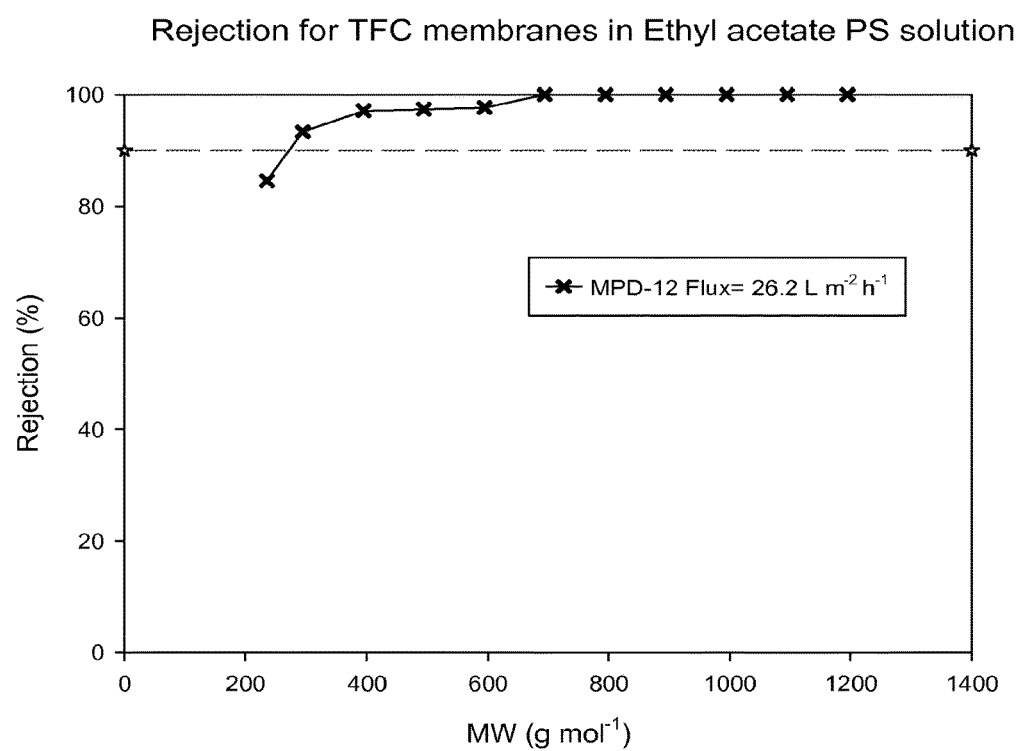
FIG. 9 shows MWCO curve and flux of a TFC membrane which has been treated with DMF as an activating solvent. Nanofiltration of a feed solution comprising polystyrene oligomers dissolved in ethyl acetate has been performed at 30 bar and 30° C.

FIG. 9 shows rejection curves and flux for TFC membranes during nanofiltration of ethyl acetate/PS solution. Without DMF treatment the TFC membranes showed no flux in toluene or ethyl acetate.

Example 3

Membrane supports were fabricated as per EXAMPLE 1 but were not conditioned with PEG. TFC membranes were fabricated on these non-conditioned support membranes as per EXAMPLE 1. The performance of TFC membranes prepared on membrane supports with and without PEG was then evaluated and compared.

Membrane Identification Codes for the TFC Membranes Prepared in this Example are as Follows:

| Entry No. | Membrane | Membrane code |
| --- | --- | --- |
| 2 | TFC membrane prepared on crosslinked PI as support impregnated withPEG | MPD-n |
| 3 | TFC membrane prepared on crosslinked PI support not impregnated with PEG | MPD-NP-n |

Where n identifies membranes made in independent batch n.

Figure 10:
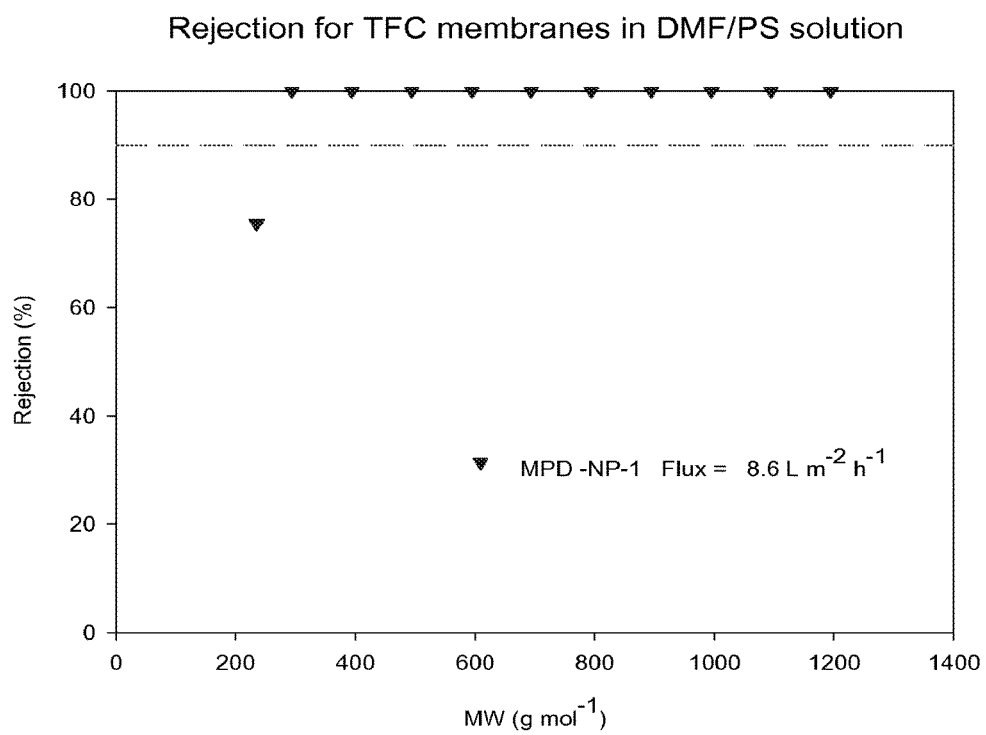
FIG. 10 shows MWCO curves and fluxes of TFC membranes prepared on a crosslinked polyimide support membrane which was not impregnated with a conditioning agent. Nanofiltration of a feed solution comprising polystyrene oligomers dissolved in DMF has been performed at 30 bar and 30° C.
Figure 11:
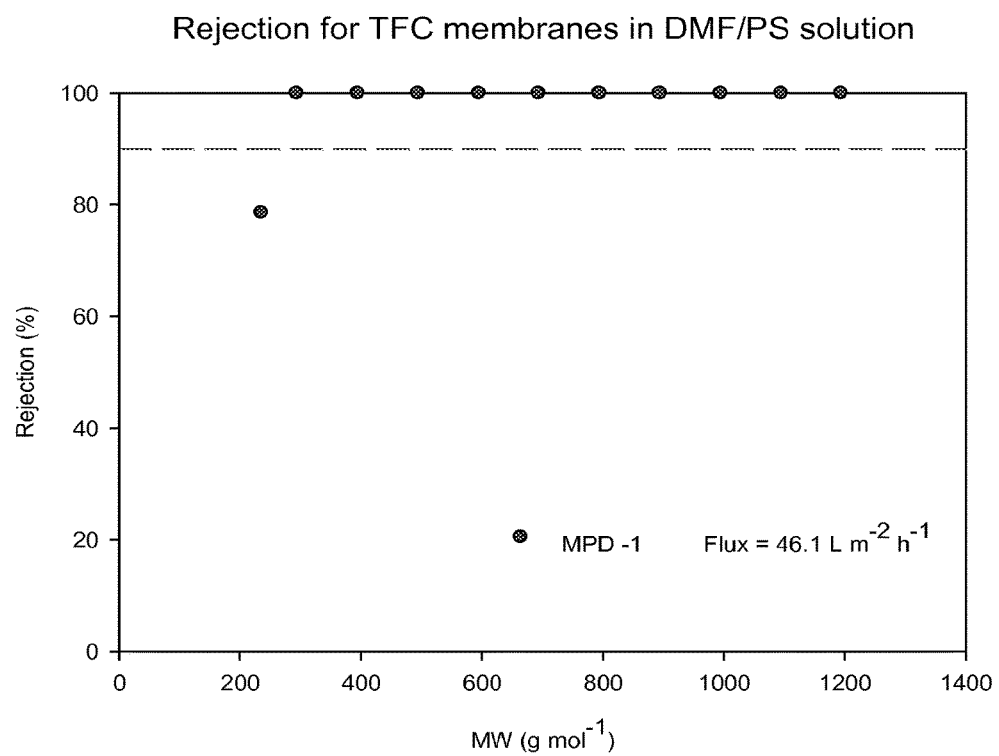
FIG. 11 shows MWCO curve and flux of a TFC membrane prepared on a crosslinked polyimide support membrane which was impregnated with PEG as a conditioning agent. Nanofiltration of a feed solution comprising polystyrene oligomers dissolved in DMF has been performed at 30 bar and 30° C.

FIG. 10 shows rejection curves and flux for TFC membranes prepared on membrane supports without PEG in DMF/PS solution. FIG. 11 shows rejection curves and flux for TFC membranes prepared on membrane supports with PEG in DMF/PS solution. An increase in flux can be observed when TFC membranes are prepared on membrane supports containing PEG.

In this example the salt rejection of TFC membranes prepared with PEG impregnated support membranes was compared with those prepared with non-impregnated supports. For flux and rejection test, 150 mL of 0.2% NaCl (2000 ppm) aqueous solution were used in a dead-end cell filtration set-up at 30 bar pressure. It is clear that impregnating the support with PEG prior to the interfacial polymerisation reaction enhances water flux without changing salt rejection. The choice of the support membrane material depends on the application. For water applications, it is not required to have a solvent stable support membrane, so PEG-impregnated support membranes made from polysulfone and polyethersulfone are suitable and lead to enhanced water flux without changing rejection.

| Membrane | NaCl Rejection (%) | NaCl aqueous solution Flux (L m$^{-2}$ h$^{-1}$) at 30 bar |
| --- | --- | --- |
| MPD-NP | 97.5 | 6.0 |
| MPD | 97.5 | 22.4 |

Example 4

In this particular example TFC membranes were prepared on PEEK support membranes, as follows:
Fabrication of Membrane Supports from Polyetheretherketone (PEEK):

A polymer dope solution was prepared by dissolving 12.3% (w/w) PEEK in 79.4% methane sulfonic acid (MSA) and 8.3% sulfuric acid ($H_2SO_4$). The solution was stirred overnight until complete dissolution. A viscous solution was formed, and allowed to stand for 10 hours to remove air bubbles. The solution was then cast on a polyester nonwoven backing material taped to a glass plate using a casting knife (Elcometer 3700) set at a thickness of 250 µm. Immediately after casting, the membrane was immersed in a water bath where phase inversion occurred. After 15 minutes, it was changed to a new water bath and left for an hour. The wet membrane was then immersed in a water bath to remove any residual preparation solvents.

The final step for preparing the PEEK support membrane involved immersing the membrane overnight into a conditioning agent bath consisting of a volume ratio of 3:2 polyethylene glycol 400/isopropanol. The membrane was then wiped with tissue paper and air dried. TFC membranes were fabricated as per EXAMPLE 1, section 1.2 on top of the PEEK support membrane. The TFC membranes were treated with DMF as an activating solvent as per EXAMPLE 1. Some of the TFC membranes were not treated with an activating solvent for comparison.

Figure 12:
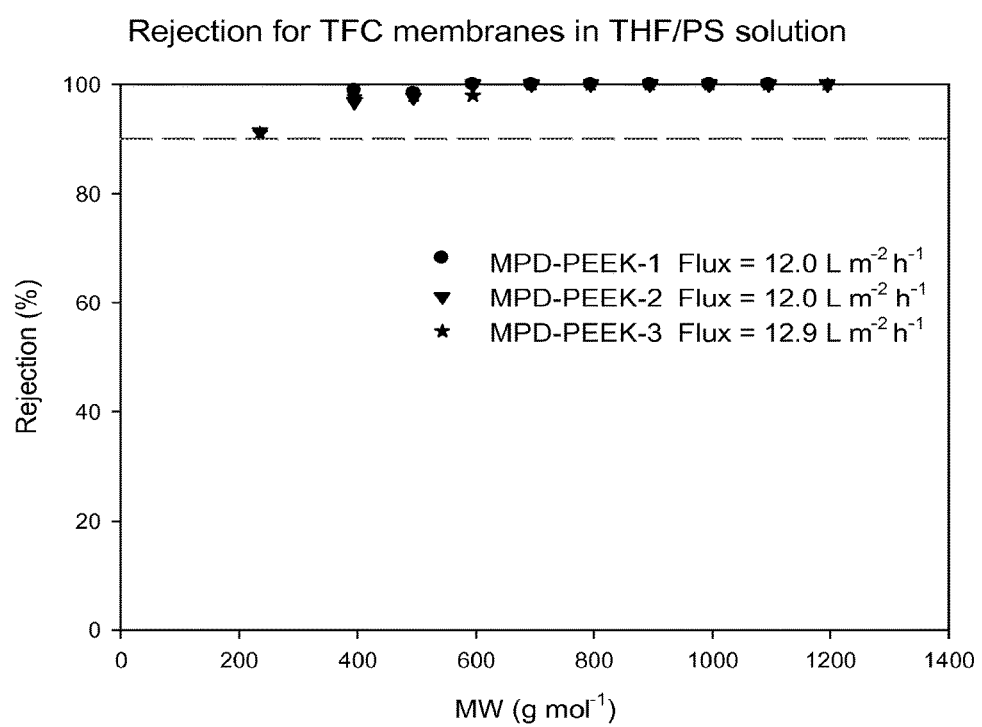
FIG. 12 shows MWCO curves and fluxes for TFC membranes prepared on a PEEK support membrane. The TFC membrane has not been treated with DMF as an activating solvent. Nanofiltration of a feed solution comprising polystyrene oligomers dissolved in THF has been performed at 30 bar and 30° C.
Figure 13:
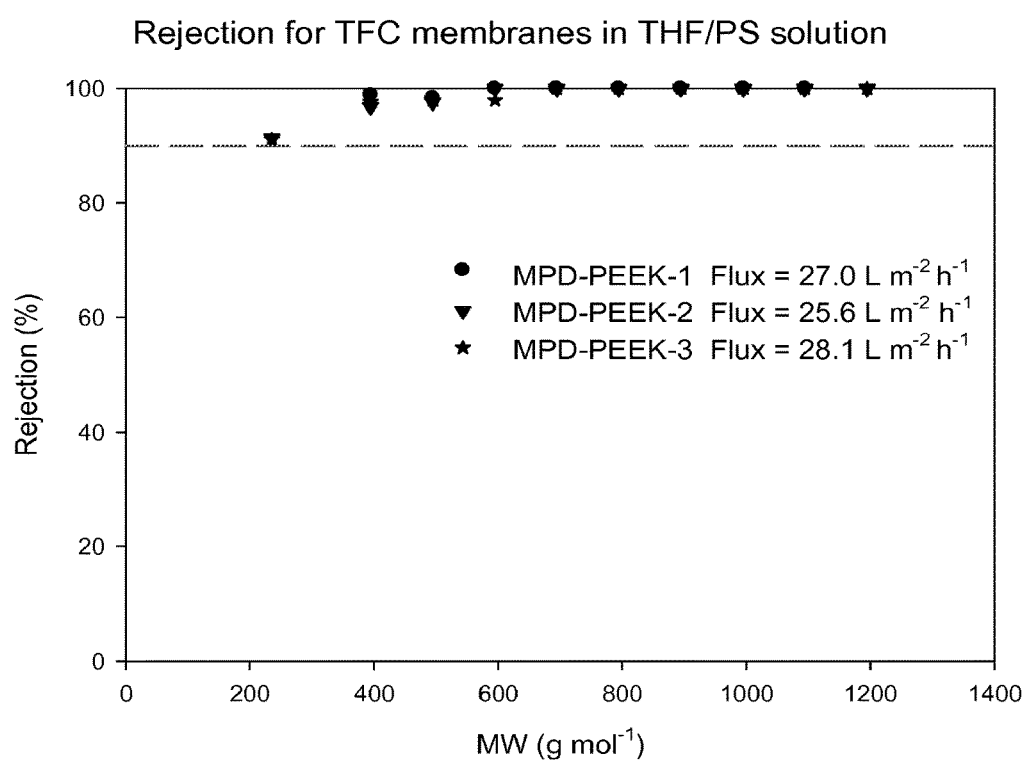
FIG. 13 shows MWCO curves and fluxes for TFC membranes prepared on a PEEK support membrane. The TFC membrane has been treated with DMF as an activating solvent. Nanofiltration of a feed solution comprising polystyrene oligomers dissolved in THF has been performed at 30 bar and 30° C.

FIG. 12 shows rejection curves and flux for TFC membranes during nanofiltration of THF/PS solution without treating the membrane with an activating solvent. FIG. 13 shows rejection curves and flux for TFC membranes during nanofiltration of THF/PS solution after treating the membranes with DMF as an activating solvent.

Example 5

TFC membranes were fabricated as per EXAMPLE 1. After the interfacial polymerisation reaction the membranes were treated in a quenching medium comprising a reactive monomer dissolved in a solvent (step c).
Treatment of TFC Membranes in Quenching Medium A post-formation treatment step was carried out on the composite membranes in which the membranes were contacted with a quenching medium. In this example the quenching medium was a solution of a fluoroamine or amino siloxane in hexane. The contact time was 1 minute via immersion. The reactive monomer end-caps the free acyl chloride groups left in the polyamide film. In this example, the quenching step modifies the membrane chemistry, making it more hydrophobic by capping the unreacted acyl chloride groups with amines comprising halo-, silyl- or siloxane-substituents. The chemical structures of the monomers used for the interfacial polymerisation reaction are shown in Scheme 2.

Scheme 2. Polyamide with fluorinated backbone (incorporating fluoroamine through capping).

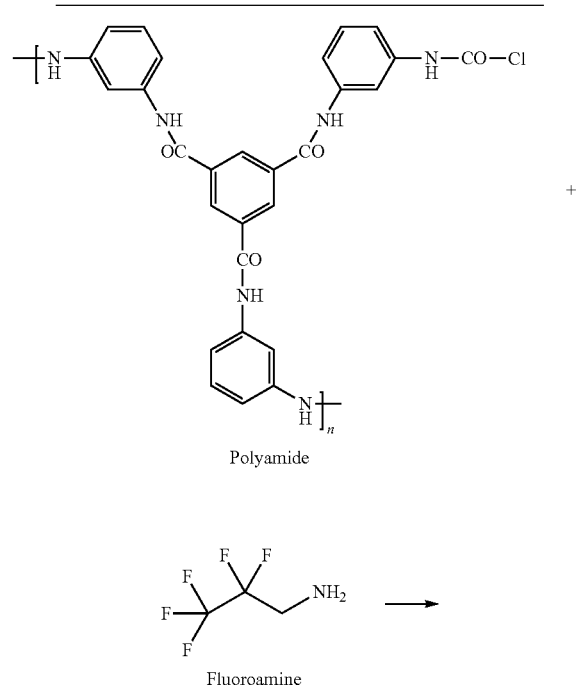

-continued

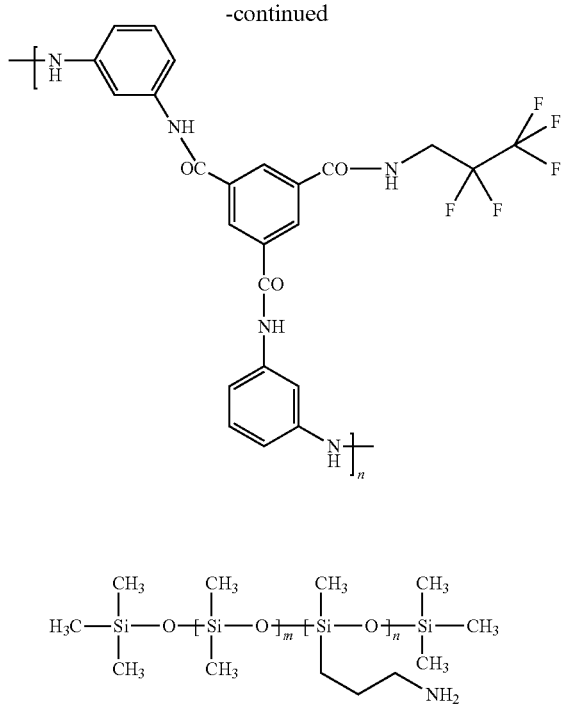

Membrane Identification Codes for the TFC Membranes Prepared in this Example are as Follows:

| Entry No. | Membrane | Membrane code |
|---|---|---|
| 4 | TFC membrane prepared on crosslinked PI as support impregnated with PEG. | MPD-n |
| 5 | TFC membrane prepared on crosslinked PI as support impregnated with PEG. The TFC membrane is post-treated with a solution of 2,2,3,3,3-pentafluoropropylamine in hexane. | Fluoroamine-MPD-n |
| 6 | TFC membrane prepared on crosslinked PI as support impregnated with PEG. The TFC membrane is post-treated with a solution of poly[dimethylsiloxane-co-(3-aminopropyl)methylsiloxane] in hexane. | Aminosiloxane-MPD-n |

Where n identifies membranes made in independent batch n.

Figure 14:
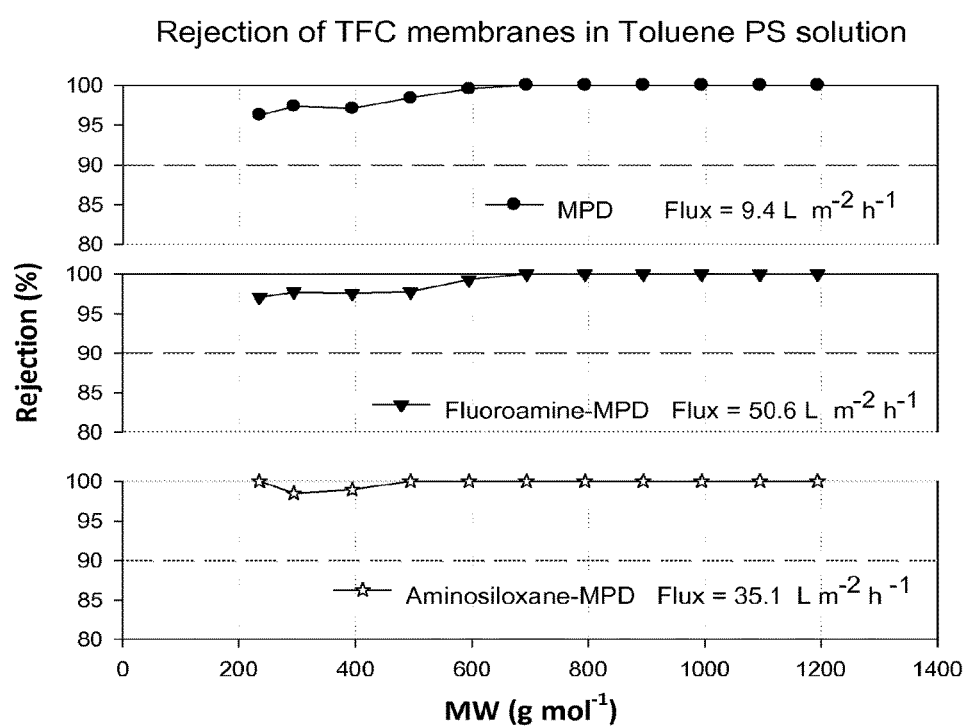
FIG. 14 shows MWCO curves and fluxes for TFC membranes containing hydrophobic groups added after the interfacial polymerisation reaction. The resulting composite membranes are treated with DMF as an activating solvent. Nanofiltration of a feed solution comprising polystyrene oligomers dissolved in THF has been performed at 30 bar and 30° C.

The performance of the chemically modified TFC membranes was evaluated in toluene. For the MWCO curves and flux test in Toluene eight new TFC membranes were tested at each time and the results for both rejection and flux were reproducible. FIG. 14 shows rejection curves and flux for these hydrophobic TFC membranes in Toluene/PS solution.

Example 6

Crosslinked polyimide supports were fabricated as per EXAMPLE 1 and impregnated with PEG. During the interfacial polymerisation reaction the trimesoyl chlode was blended with a fluoromonoacyl chloride to make the membrane more hydrophobic and more open.

Formation of Thin Film Composite Membranes by Interfacial Polymerisation:

TFC membranes were hand-cast on the crosslinked polyimide support membrane containing PEG through interfacial polymerization. The support membrane was taped to a glass plate and placed in an aqueous solution of 2% (w/v) m-phenylenediamine (MPD, >99%, Sigma-Aldrich) for approximately 2 min. The MPD loaded support membrane was then rolled with a roller to remove excess solution. The MPD saturated membrane support was then immersed in a solution of 0.1% (w/v) trimesoyl chloride (TMC, 98%, Sigma-Aldrich) blended with perfluorooctanoylchloride (7:1) in hexane. After 1 min of reaction, the resulting membranes were withdrawn from the hexane solution and rinsed with water step (c) (immersing membrane into quenching medium). The chemical structures of the monomers used for the interfacial polymerization reaction are shown in Scheme 3.

Scheme 3. Polyamide with fluorinated backbone (incorporating fluoro-acid chloride in organic phase).

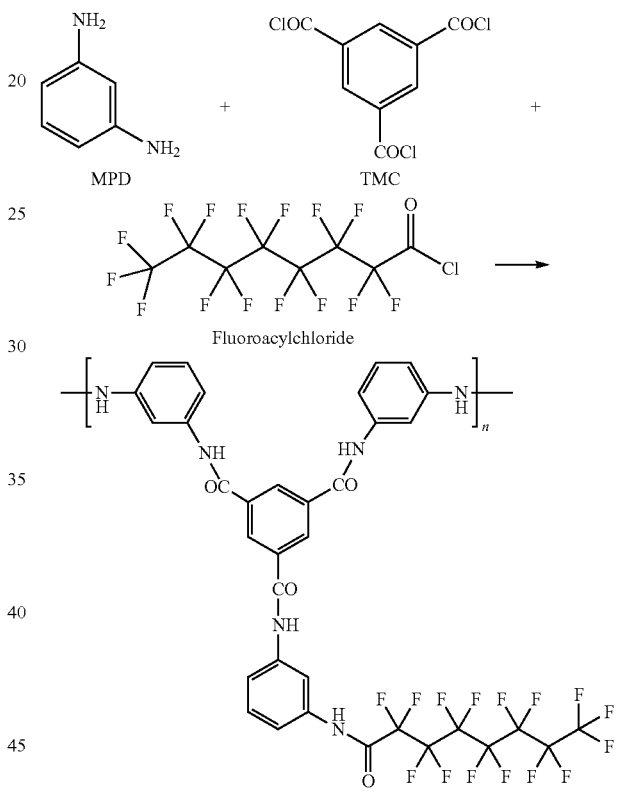

Membrane Identification Codes for the TFC Membranes Prepared in this Example are as Follows:

| Entry No. | Membrane | Membrane code |
|---|---|---|
| 7 | TFC membrane prepared on crosslinked PI as support impregnated with PEG. | MPD-n |
| 8 | TFC membrane prepared on crosslinked PI as support impregnated with PEG. During interfacial polymerisation the TMC is blended with Perfluorooctanoylchloride to render the membrane more hydrophobic and with higher MWCO | Fluoroacylchloride-MPD-n |

Where n identifies membranes made in independent batch n.

Figure 15:
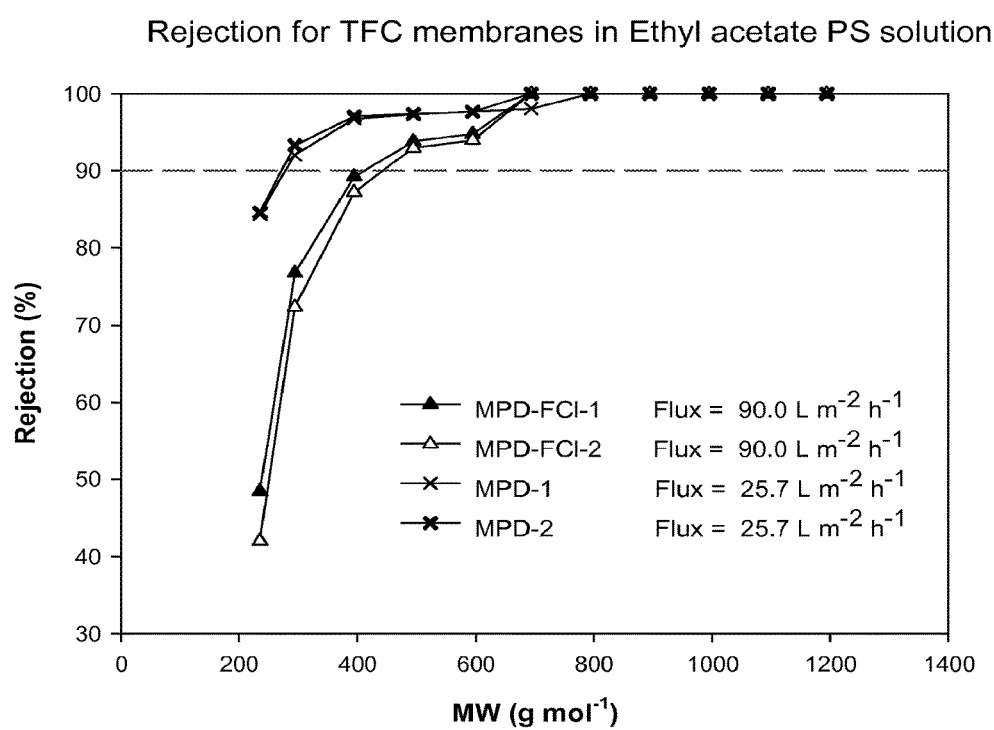
FIG. 15 shows MWCO curves and fluxes for TFC membranes containing hydrophobic groups added during the interfacial polymerisation reaction. The resulting composite membranes are treated with DMF as an activating solvent. Nanofiltration of a feed solution comprising polystyrene oligomers dissolved in THF has been performed at 30 bar and 30° C.

The performance of the chemically modified TFC membranes was evaluated in ethyl acetate. For the MWCO curves and flux test in ethyl acetate eight new TFC membranes were tested at each time and the results for both rejection and flux were reproducible. FIG. 15 shows rejection curves and flux for these hydrophobic TFC membranes in ethyl acetate/PS solution.

The invention claimed is:

1. An interfacial polymerization process for forming a composite membrane suitable for nanofiltration operations in polar aprotic solvents, said process comprising the sequential steps of:
   (a) impregnating a porous support membrane comprising a first conditioning agent, with a first reactive monomer solution comprising:
      (i) a first solvent for the said first reactive monomer and
      (ii) a first reactive monomer;
      wherein the first conditioning agent is polyethylene glycol, and
      wherein said support membrane is stable in polar aprotic solvents and is formed from crosslinked polyimide, crosslinked polybenzimidazole, crosslinked polyacrylonitrile, Teflon, polypropylene, or polyether ether ketone (PEEK), or sulfonated polyether ether ketone (S-PEEK);
   (b) contacting the impregnated support membrane with a second reactive monomer solution comprising:
      (i) a second solvent for the second reactive monomer and
      (ii) a second reactive monomer;
      wherein the first solvent and the second solvent form a two-phase system;
   (c) after a reaction period, immersing the resulting composite membrane into a quench medium;
   (d) treating the resulting composite membrane with an activating solvent,
      wherein the activating solvent is selected from the group consisting of dimethylformamide, N-methyl-2-pyrrolidone, dimethyl sulfoxide, dimethylacetamide, or a mixture thereof, and:
   (e) optionally, impregnating the resulting composite membrane with a second conditioning agent,
      wherein the second conditioning agent is a non-volatile liquid, and
      wherein the use of both the first conditioning agent and the activating solvent increases the organic solvent flux of the composite membrane.

2. A process according to claim 1, wherein the support membrane is formed from crosslinked polyimide.

3. A process according to claim 1, wherein the first reactive monomer solution comprises an aqueous solution of a polyamine.

4. A process according to claim 1, wherein the first reactive monomer solution comprises an aqueous solution of a 1,6 hexenediamine, m-phenylenediamine, or poly(ethyleneimine).

5. A process according to claim 1, wherein the second reactive monomer solution contains a polyacyl chloride.

6. A process according to claim 1, wherein the composite membrane is treated in step (d) with the activating solvent by immersion or by washing in the activating solvent.

7. A process according to claim 1, wherein the composite membrane is treated in step (d) with the activating solvent by filtration through the membrane using the activating solvent.

8. A process according claim 1, wherein the activating solvent is dimethylformamide or dimethyl sulfoxide.

9. A process according to claim 1 in which the contacting in step (b) is performed in a time between about 5 seconds and about 5 hours.

10. A process according to claim 1 in which the temperature of the solution in step (b) is held between about 10° C. and about 100° C.

11. The process according to claim 1, wherein the second reactive monomer solution contains trimesoyl chloride, isophthaloyl dichloride, sebacoyl chloride, or a mixture thereof.

12. The process according to claim 1, wherein the activating solvent is dimethylformamide.

13. The process according to claim 1, wherein the concentration of the first reactive monomer in the first reactive monomer solution, and the second reactive monomer in the second reactive monomer solution, is 0.01 to 5 wt. %.

14. The process according to claim 1, wherein the first reactive monomer is m-phenylenediamine, the second reactive monomer is trimesoyl chloride, and the activating solvent is dimethylformamide.

15. The process according to claim 1, wherein the second conditioning agent is selected from one or more of synthetic oils, mineral oils, vegetable fats and oils, higher alcohols, glycerols, and glycols.

16. A method comprising the step of:
   performing nanofiltration of a feed stream solution using the membrane produced by the process of claim 1, wherein the feed stream solution comprises a solvent and dissolved solutes.

* * * * *